US011445572B2

(12) United States Patent
Harper et al.

(10) Patent No.: US 11,445,572 B2
(45) Date of Patent: Sep. 13, 2022

(54) IOT GATEWAY FOR REMOTE NATURAL GAS COMPRESSION SYSTEMS

(71) Applicant: FW Murphy Production Controls, LLC, Tulsa, OK (US)

(72) Inventors: Trevor Harper, Boerne, TX (US); Kennon Guglielmo, San Antonio, TX (US)

(73) Assignee: FW Murphy Production Controls, LLC, Tulsa, OK (US)

( * ) Notice: Subject to any disclaimer, the term of this patent is extended or adjusted under 35 U.S.C. 154(b) by 98 days.

(21) Appl. No.: 17/097,070

(22) Filed: Nov. 13, 2020

(65) Prior Publication Data
US 2021/0153295 A1 May 20, 2021

Related U.S. Application Data

(60) Provisional application No. 62/935,628, filed on Nov. 14, 2019.

(51) Int. Cl.
| | |
|---|---|
| H04L 12/28 | (2006.01) |
| H04W 88/16 | (2009.01) |
| H04L 67/00 | (2022.01) |
| H04L 67/5682 | (2022.01) |
| F02D 41/00 | (2006.01) |

(Continued)

(52) U.S. Cl.
CPC .......... *H04W 88/16* (2013.01); *F02D 19/027* (2013.01); *F02D 41/0027* (2013.01); *G06F 8/64* (2013.01);

(Continued)

(58) Field of Classification Search
CPC .... F02D 19/027; F02D 29/04; F02D 41/0027; F02D 41/266; F02D 2250/00;

(Continued)

(56) References Cited

U.S. PATENT DOCUMENTS

| | | | |
|---|---|---|---|
| 7,403,850 B1 * | 7/2008 | Boutin | G01M 15/05 701/107 |
| 9,860,677 B1 * | 1/2018 | Agerstam | H04L 67/28 |

(Continued)

FOREIGN PATENT DOCUMENTS

EP 3270460 A1 1/2018

OTHER PUBLICATIONS

Gavrila et al., Satellite SDR Gateway for M2M and IoT applications, IEEE, 9 pages, Jun. 20, 2019.*

*Primary Examiner* — Frank Duong
(74) *Attorney, Agent, or Firm* — William H. Quirk; Alexander J. Antonio; Rosenthal Pauerstain Sandoloski Agather, LLP

(57) ABSTRACT

An Internet of Things (IoT) gateway integrated into a real-time monitoring system for skid-mounted natural gas compression systems. The IoT gateway enables remote monitoring, troubleshooting, and diagnosing of natural gas compression systems by providing access to cellular and satellite communication networks for communicating operational data to one or more remote servers. The IoT gateway can be configured to select a communication network based on an order of priority and other various criteria. The order of priority and the selection criteria may be updated over the air. The IoT gateway can be further configured to receive and relay software and other updates to one or more components of the natural gas compression system. The IoT gateway is configured to meet various regulatory compliance standards and is explosion proof.

20 Claims, 11 Drawing Sheets

(51) Int. Cl.
  *H04W 4/38* (2018.01)
  *F02D 19/02* (2006.01)
  *G06F 8/61* (2018.01)
  *H04W 88/06* (2009.01)
  *H04W 48/18* (2009.01)
  *H04L 69/18* (2022.01)
  *G16Y 10/35* (2020.01)

(52) U.S. Cl.
  CPC .......... *H04L 67/2852* (2013.01); *H04L 67/34* (2013.01); *H04W 4/38* (2018.02); *H04W 48/18* (2013.01); *H04W 88/06* (2013.01); *G16Y 10/35* (2020.01); *H04L 69/18* (2013.01)

(58) Field of Classification Search
  CPC ........ F04D 27/001; F04D 29/002; G06F 8/64; G16Y 10/35; H04L 12/46; H04L 12/66; H04L 67/2852; H04L 67/12; H04L 67/125; H04L 67/34; H04L 69/18; H04L 2012/40228; H04L 2012/46; H04L 2012/5618; H04W 4/38; H04W 4/70; H04W 40/22; H04W 48/18; H04W 88/06; H04W 88/16
  See application file for complete search history.

(56) References Cited

U.S. PATENT DOCUMENTS

| | | | |
|---|---|---|---|
| 10,084,868 B2* | 9/2018 | Chandra | G01C 11/02 |
| 11,178,529 B2* | 11/2021 | Chong | H04L 67/12 |
| 11,190,861 B2* | 11/2021 | Bali | H04L 41/5003 |
| 2013/0300574 A1* | 11/2013 | Gillette, II | H02J 13/00022 |
| | | | 340/870.01 |
| 2014/0241354 A1* | 8/2014 | Shuman | H04L 65/102 |
| | | | 370/390 |
| 2015/0381737 A1* | 12/2015 | Quinn | H04L 67/12 |
| | | | 709/217 |
| 2016/0065653 A1* | 3/2016 | Chen | H04L 41/0853 |
| | | | 715/735 |
| 2016/0128043 A1* | 5/2016 | Shuman | H04W 72/044 |
| | | | 370/329 |
| 2016/0198536 A1* | 7/2016 | Britt | H02J 7/00 |
| | | | 315/149 |
| 2016/0217176 A1* | 7/2016 | Haviv | G06F 16/24573 |
| 2018/0054376 A1* | 2/2018 | Hershey | H04L 12/66 |
| 2018/0284786 A1* | 10/2018 | Moshkina-Martinson | |
| | | | G05D 1/0219 |
| 2019/0234786 A1* | 8/2019 | Klicpera | G01M 3/26 |
| 2020/0326684 A1* | 10/2020 | Chand | G05B 23/024 |

* cited by examiner

IOT GATEWAY FOR REMOTE NATURAL GAS COMPRESSION SYSTEMS

CLAIM OF PRIORITY TO PRIOR APPLICATION

This application claims the benefit of the filing date of U.S. Provisional Application Ser. No. 62/935,628, filed on Nov. 14, 2019. The entire disclosure, including any claims and drawings, of U.S. Provisional Application Ser. No. 62/935,628, is hereby incorporated by reference into the present disclosure.

COPYRIGHT & TRADEMARK NOTICES

Certain marks referenced herein may be common law or registered trademarks of the applicants' assignee or third parties affiliated or unaffiliated with the applicants' assignee. Use of these marks is for providing an enabling disclosure by way of example and shall not be construed to exclusively limit the scope of the disclosed subject matter to material associated with such marks.

FIELD

The present disclosure pertains to the field of natural gas production and distribution and to skid-mounted natural gas handling systems commonly used in that field. More particularly, this disclosure relates to remote communication and management of data relative to the monitoring and control of such skid-mounted natural gas handling systems.

BACKGROUND

Although skid-mounted natural gas compressors operating in Class 1, Division 2 environments have been fitted or embedded with sensors for decades, only recently have commercial products for these areas begun to adapt and expand such measurements and related measurement control within the context of the Internet of Things (IoT), in part because the explosive nature of such environments teaches away from complexity much less electromagnetic transmission. In the past, data has been collected in industrial environments by people using dedicated data collectors, often recording sensor data on media such as tape or a hard drive for later analysis. Data is commonly returned to a central office for analysis, after which the analysis can be used as a basis for diagnosing problems in an environment and/or suggesting ways to improve operations. This work has traditionally taken place on a time scale of weeks or months and has been directed to limited data sets.

The development of the IoT technology has made it possible to connect continuously to a significantly larger range of devices for measurement and control purposes. Typically, IoT technology is applied to consumer devices such as advanced lights, thermostats, and household appliances. Industrial environments remain comparatively underserved and underdeveloped within the IoT paradigm as those systems and environments are often complex and more difficult and problematic. For example, the range of available data is often limited, the complexity of dealing with data from multiple sensors of differing formats, and interconnection standards makes it much more difficult to produce "smart" solutions that are effective for the industrial sector. Therefore, there is a need in the art for unproved methods and systems for data collection In industrial environments, as well as for improved methods and systems for using collected data to provide improved monitoring, control, diagnosis of problems, and optimization of industrial machinery. For example, when compiled over time and analyzed, data generated by sensors embedded in industrial machinery can enable engineers to design equipment that can accomplish more work with fewer measurement-gathering passes. Fewer passes leads to reductions in idle time, less operator fatigue, lower fuel consumption, and overall improved efficiency.

Additionally, industrial machinery can have special needs such as reliable availability, distant location, varying types of carrier network operating conditions, and limiting the kinds of wireless data transmission activity to those that do not introduce risk of chemical or material explosions.

SUMMARY

For purposes of summarizing, certain aspects, advantages, and novel features are described herein. Not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

The present disclosure pertains to the adaptation of skid-mounted natural gas handling systems with an Internet of Things (IoT) networking gateway, a physical device with multiple internal antennas that enables multiple alternative local and wide area networks and their protocols and intelligently switches among those differing networks and protocols, to transfer skid data to remote locations (including a data logging cloud, to enable remote reconfigurations, and to enable remote real-time monitoring and diagnostics for the skid-mounted equipment over the air, all in ways that ensure safe operation in explosive environments that are typical for natural gas skids.

In an example embodiment, the IoT gateway can be a physical device arranged to aggregate sensor data, translate among sensor protocols, process sensor data, and transfer data and processed information to remote locations or a computing cloud employing a range of Local Area Networks (LAN), Wide Area Networks (WAN), and point-to-point communications protocols, network types, and network carriers. Embodiments of the IoT gateway can be arranged to comprise a large quantity of features and provisions. Collective sets of these features, provisions, and capabilities make the IoT gateway novel and a substantial improvement over the existing technology, approaches, devices, and methods deployed or proposed for use in the field.

A particularly important application of the IoT gateway is for the remote monitoring of equipment clusters comprising or comprised by natural gas compression systems. Such natural gas compression systems can be located on a localizing or consolidating platform (such as a "skid") that can, for example, be deployed in a remote location such as a natural gas production field.

Although much of the disclosure to follow provides numerous examples in terms of, or relating to, application of the IoT gateway within a natural gas compression system, it should be recognized that vast ranges of other industrial systems and processes can advantageously incorporate the IoT gateway in similar ways leveraging the numerous features and capabilities described in this disclosure.

Some examples of additional capabilities and features that can be provided for by hardware and/or software include:

The IoT gateway can be arranged to enable new levels of efficient operation, such as providing one or more low-power operating modes.

The IoT gateway can be arranged to provide internal data logging including logging of a variety of operating parameters, diagnostics, and event snapshots.

The IoT gateway can be arranged to configure events that trigger data collection and data transmission (for example employing Diagnostic Trouble Codes (DTC), sensor thresholds, parameter-based logical combination conditions, etc.). The IoT gateway can be configured to comprise internal antennas for use with cellular and satellite communications.

The IoT gateway can be arranged to provide wireless cellular communications to a plurality of carrier offerings (for example, to both Verizon and AT&T 4G LTE networks), and further to utilize these for remote communications with other systems and devices.

The IoT gateway can be arranged to provide satellite-based communications (for example, through the Iridium satellite network service).

The IoT gateway can be arranged to use the plurality of such networks and connections for reliability resulting from communications redundancy. If one of the cellular links fails or is unavailable, the IoT gateway can be configured to switch (in some implementations with provisions to reduce the risk of electromagnetic-radiation-induced explosion) to another cellular link. If all cellular networks fail to connect, the IoT gateway can be configured to attempt to connect via satellite.

The IoT gateway can be arranged to provide GPS capability for providing location data.

The IoT gateway can be arranged to provide Controller Area Network (CAN) communication for engine coordination or other uses.

The IoT gateway can be arranged to provide wireless communication via Wi-Fi and Bluetooth for communications with applicable devices and field support systems.

The IoT gateway can be arranged to provide Modbus master instrumentation networking capabilities.

The IoT gateway can be arranged to provide wired bus-support communication capabilities (for example RS485, I2C, SPI, Dallas OneWire™, etc.) and wired and/or fiber point-to-point communication capabilities (for example RS 232, RS 422, point-to-point Ethernet™, USB, etc.).

The IoT gateway can be arranged to provide application-level protocols (for example the Modbus serial communications protocol originally published by Modicon, now Schneider Electric, for communicating with programmable logic controllers (PLCs) and other devices, Modbus over Ethernet™ support, etc.).

The IoT gateway can be arranged to comprise non-volatile storage for data logging, software updates, and other purposes. (For example, a practical product can be configured to provide at least four gigabytes of non-volatile storage).

The IoT gateway can be configured to provide high performance operation with latency and interrupt response time sufficient to handle firmware and broader system requirements.

In addition to having unique software and electrical features, the IoT gateway can further comprise one or more various mechanical and operating condition features. For example:

The IoT gateway can be rendered with a small volume and package footprint

The IoT gateway can be rendered with a housing that is fully sealed or sealed when mounted. For example, all electrical connector sockets can be fully sealed. Additionally, electrical connector sockets can be arranged to mate with external system cables to prevent exposure to corrosion or explosive atmospheres. (Example socket connector can include 6-pin Deutsch-style connectors, RJ45 Ethernet socket connectors, Molex™ connectors, 0.1"-center ribbon-cable connectors, DB and HDB series connectors, USB connectors, etc.)

The IoT gateway can be rendered so that it can operate in extreme temperatures (for example, from $-40°$ C. to $+85°$ C.).

BRIEF DESCRIPTION OF THE DRAWING FIGURES

The above and other aspects, features and advantages of the IoT gateway will become more apparent upon consideration of the following description of preferred embodiments taken in conjunction with the accompanying drawing figures, summarized below.

Figure 3:
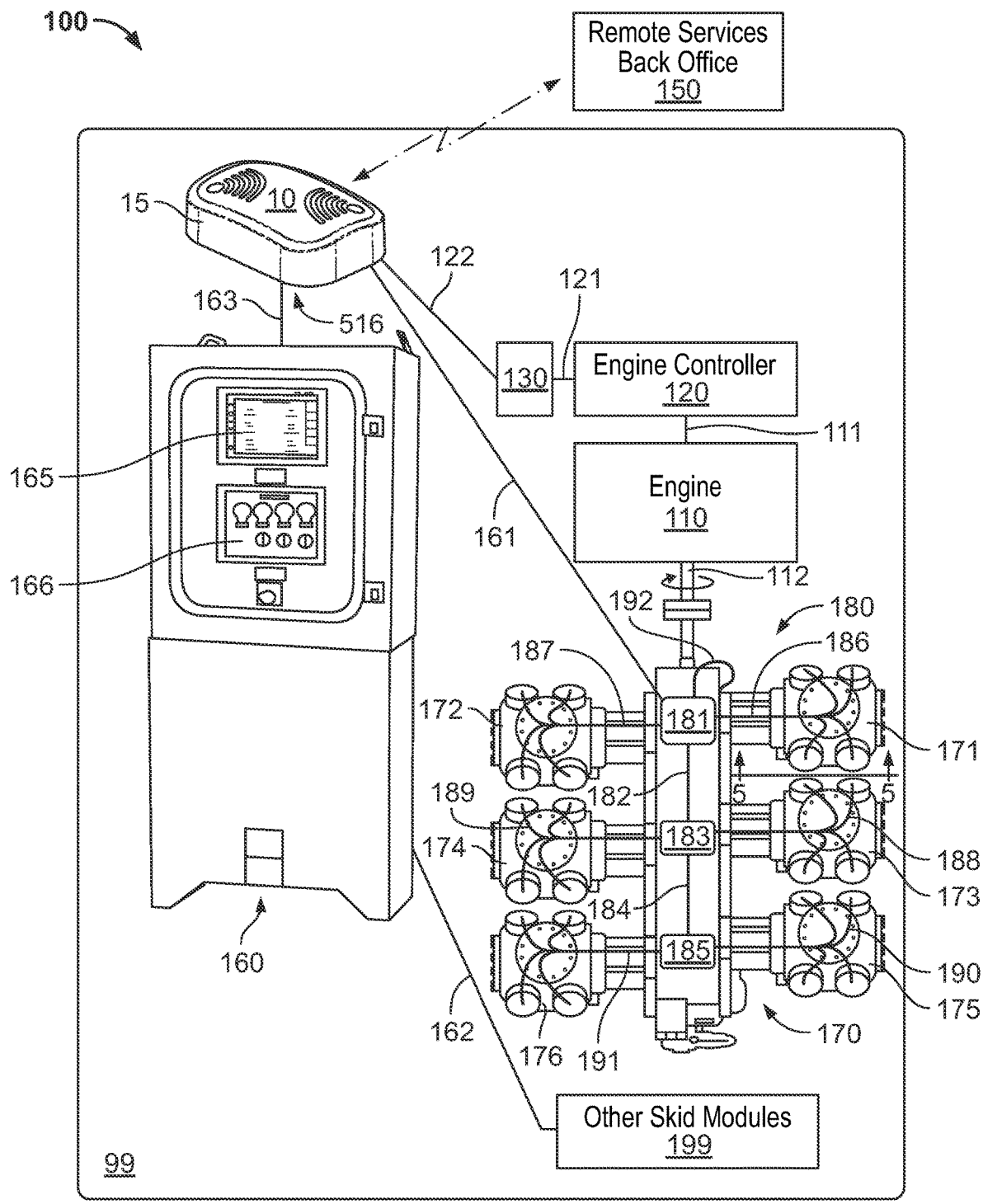

FIG. 3 is a schematic, diagrammatic illustration of a preferred embodiment of the IoT gateway 10, which is utilized with a skid-mounted monitoring system 100 within a larger system that includes a high-speed reciprocating natural gas compressor 170 operatively mounted on skid 99 together with associated components such as engine 110 and control panel 160, wherein that control panel 160 is operatively adapted to display monitored data in an intuitively diagnostic manner through displays 165 and 166 while also wirelessly transmitting such data to remote back office services 150 through IoT gateway 10 for control panel 160.

Figure 4:
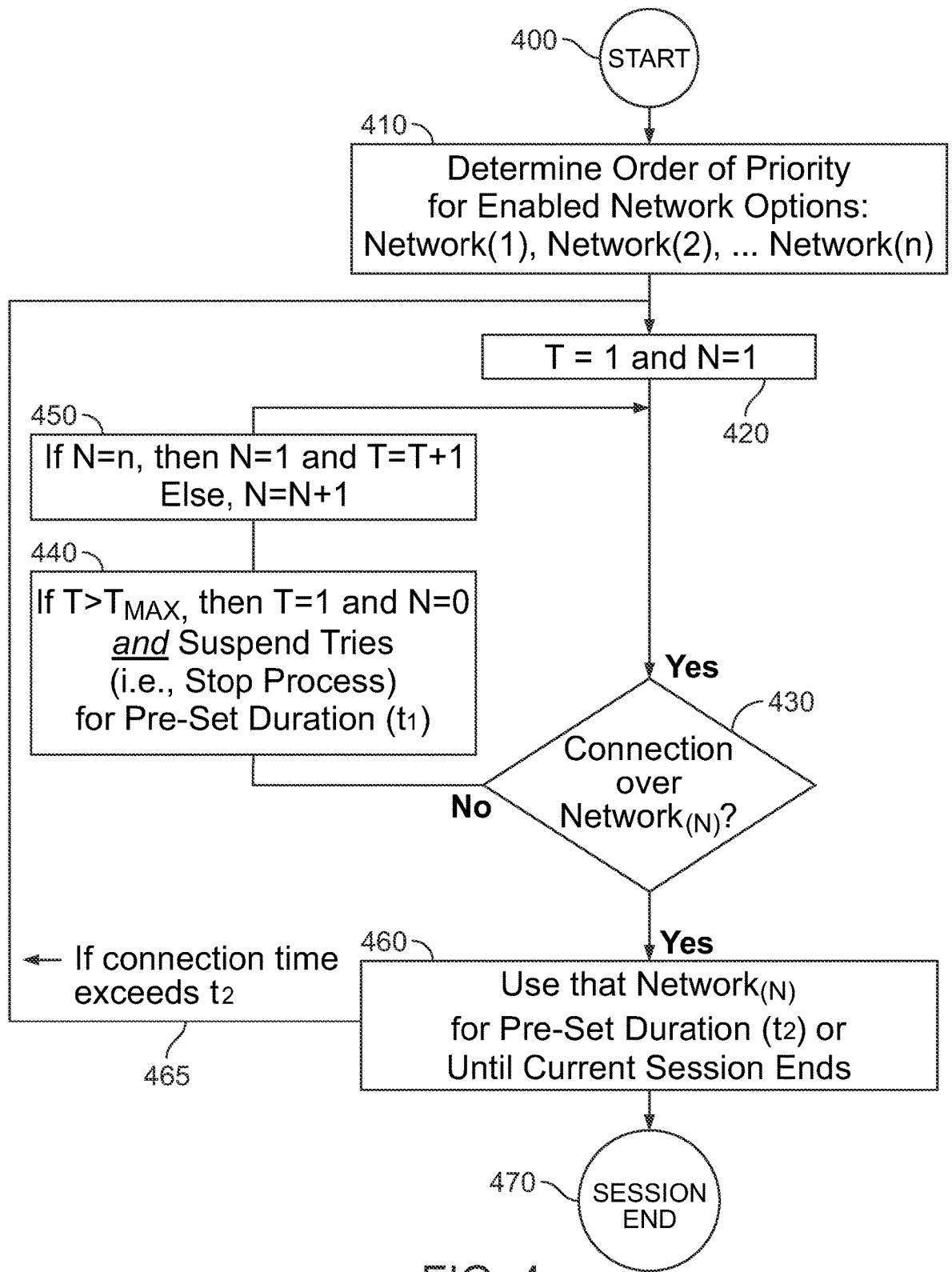

FIG. 4 depicts a flowchart illustrating a method for selecting a wireless communication wide area network by which IoT gateway 10 communicates with remote servers.

Figure 5:
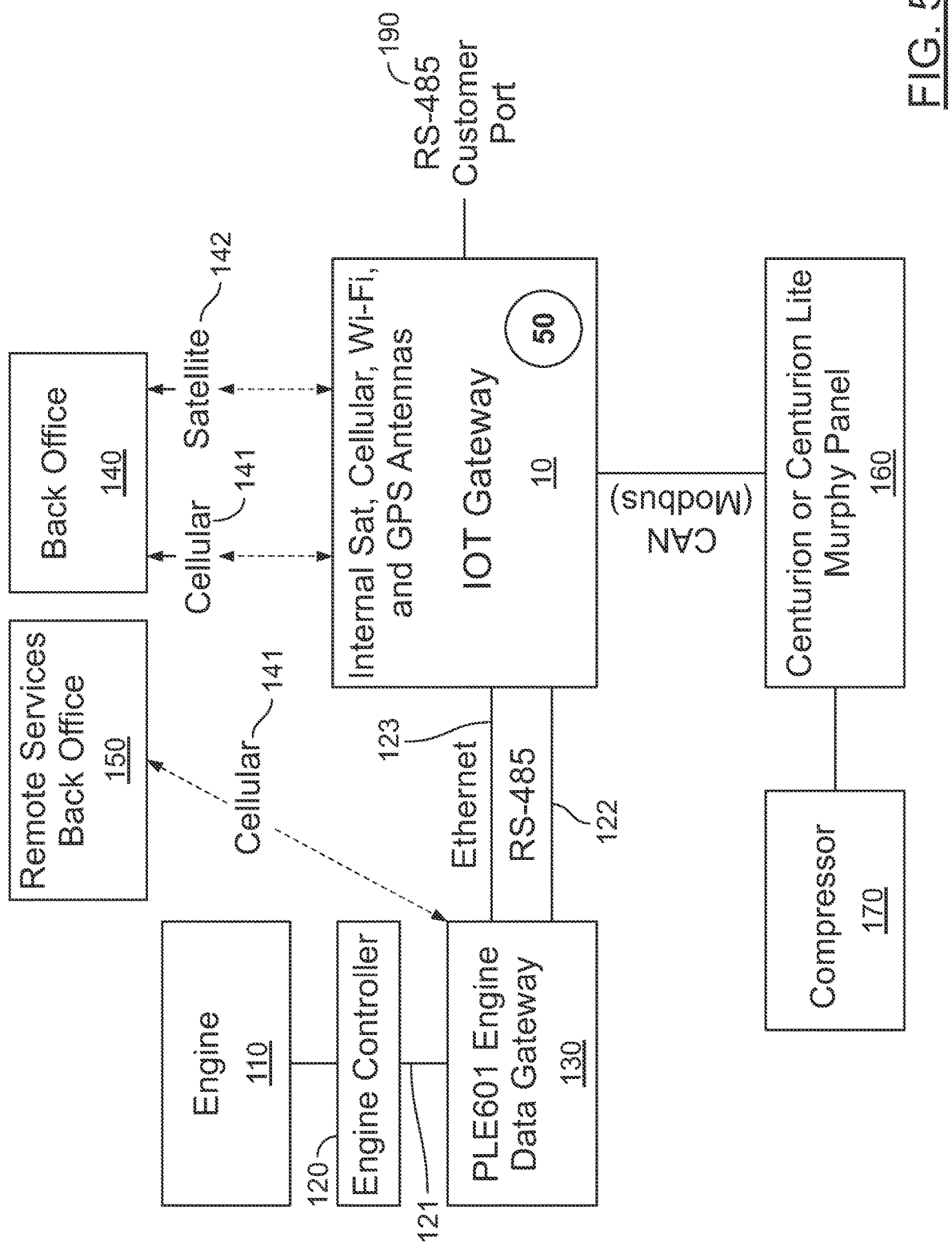

FIG. 5 depicts an example schematic diagram of IoT gateway 10 integrated with a fuel-powered engine.

Figure 6:
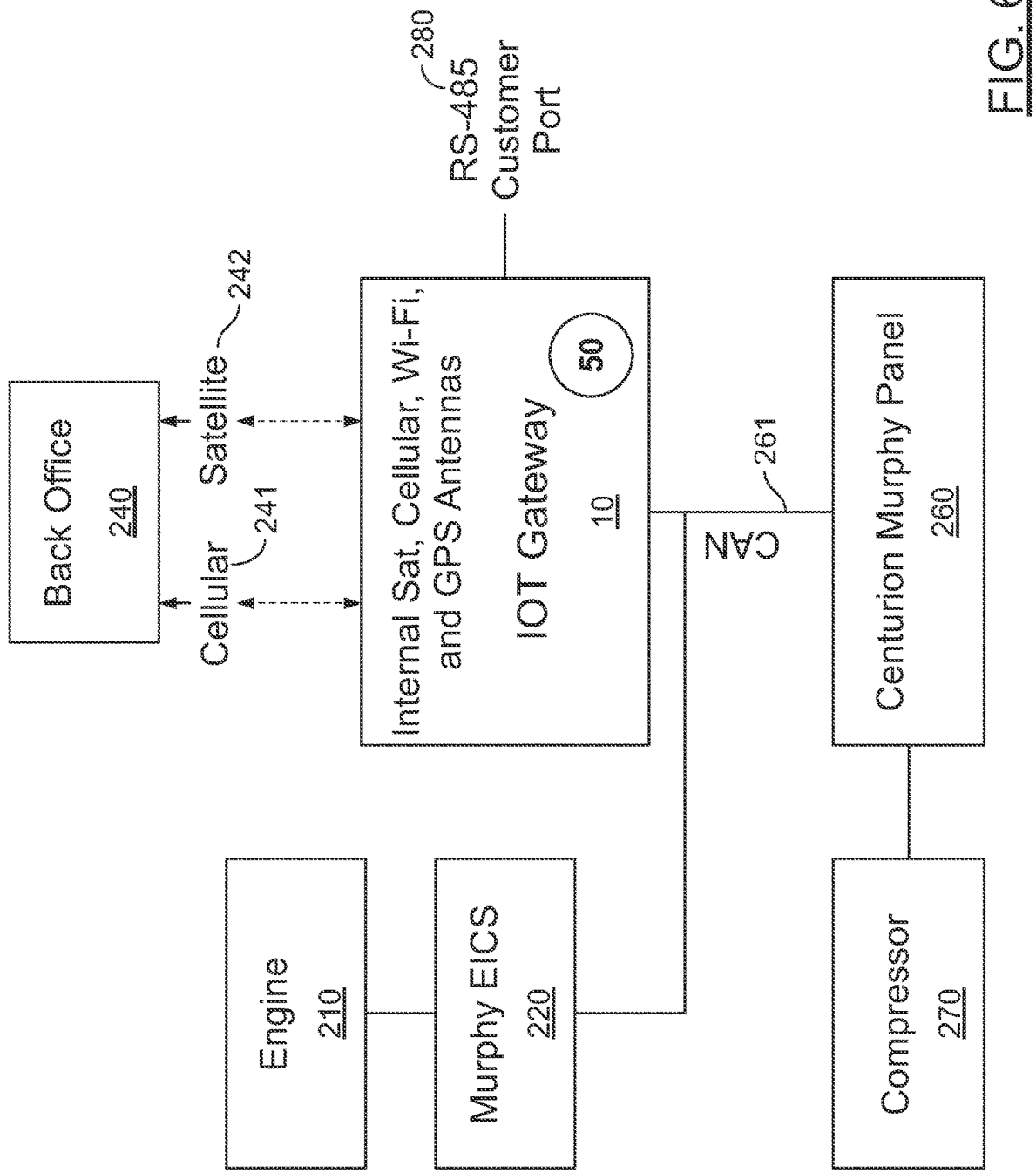

FIG. 6 depicts an example schematic diagram of IoT gateway 10 integrated with an engine and an associated or compatible engine control system, for example a Murphy Engine Integrated Control System ("EICS").

Figure 7:
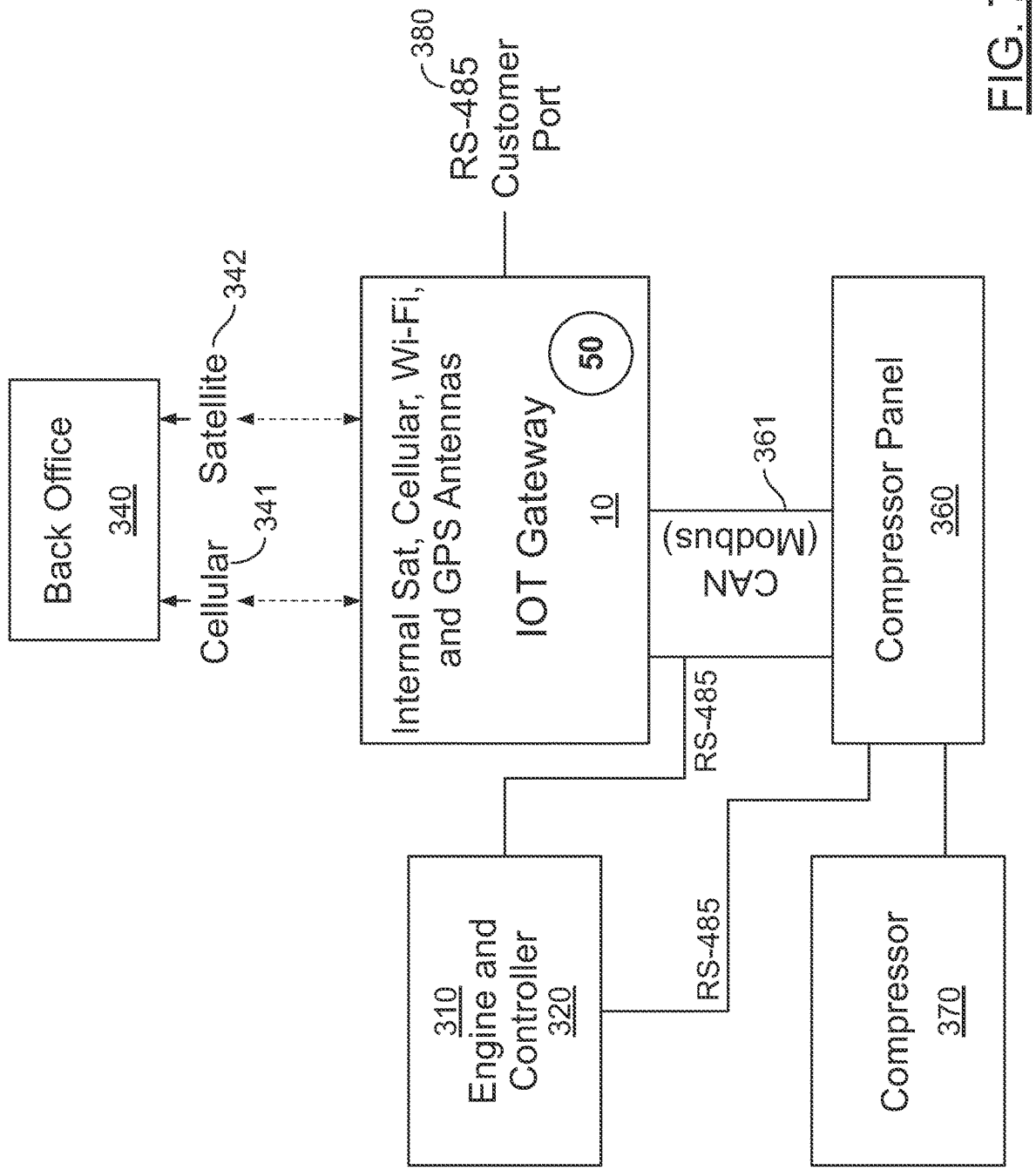

FIG. 7 depicts an example schematic diagram of IoT gateway 10 integrated with an alternative type of engine (for example, substantially differing from an engine).

Figure 8:
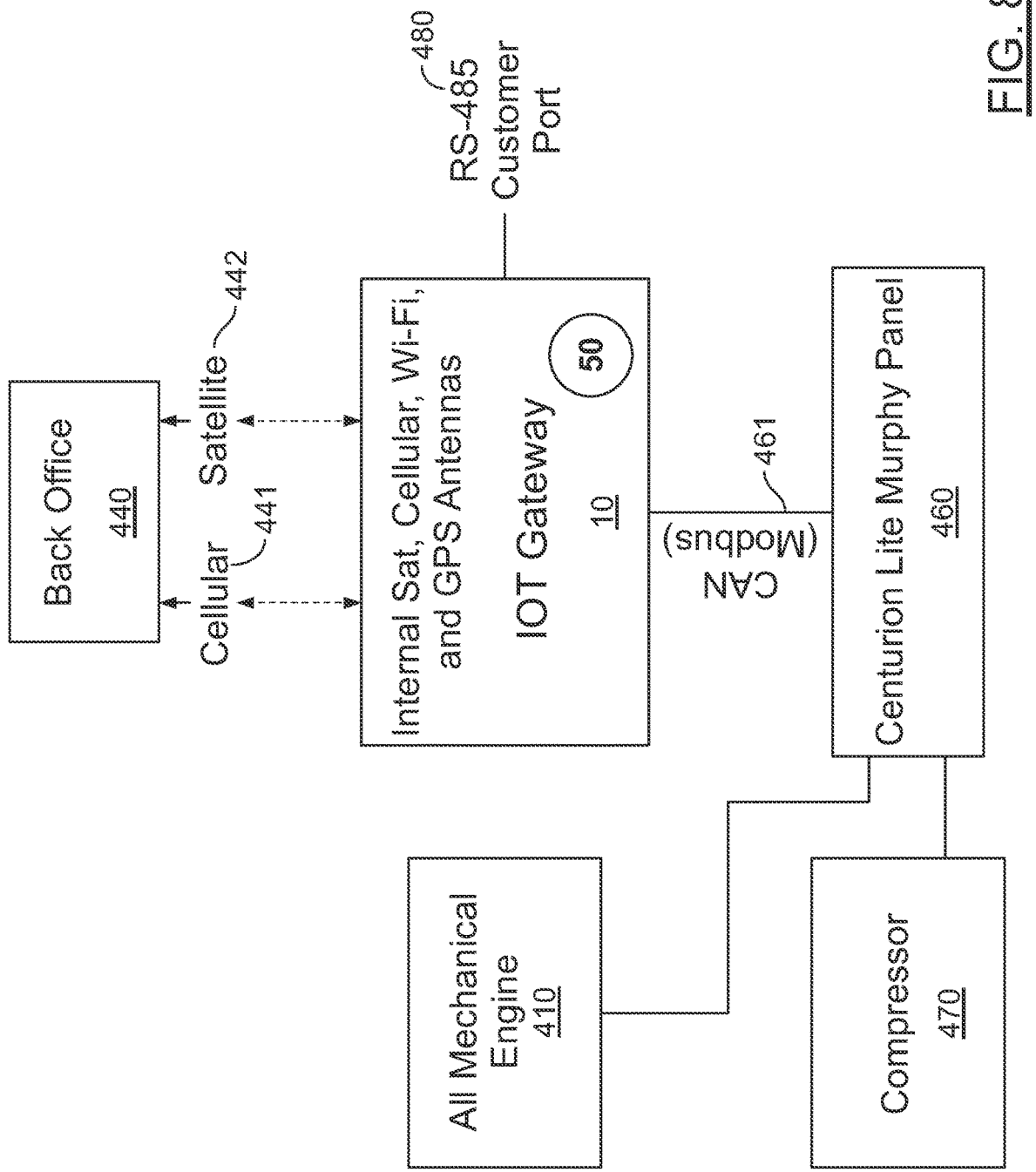

FIG. 8 depicts an example schematic diagram of IoT gateway 10 integrated with an engine.

Figure 9:
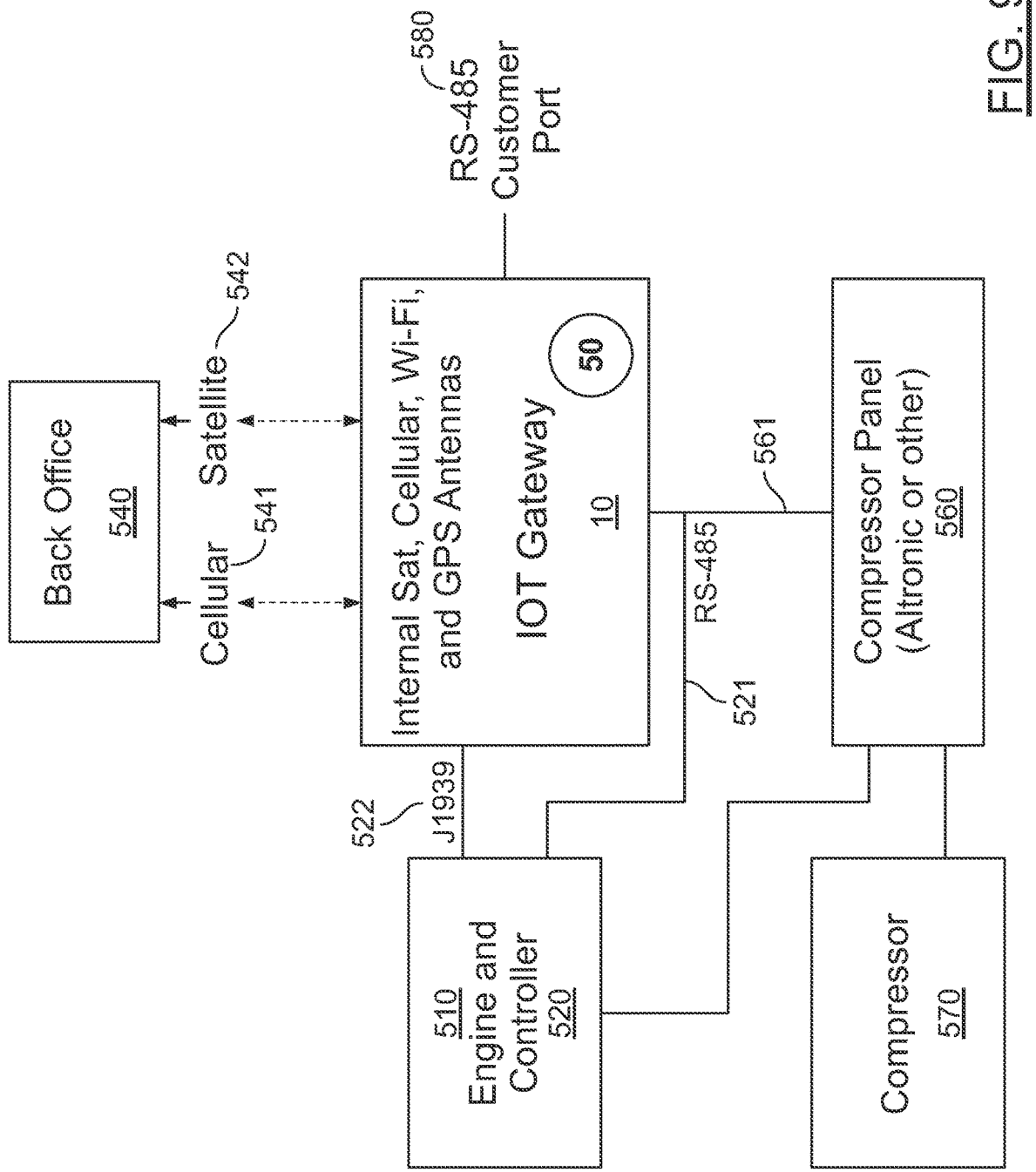

FIG. 9 depicts an example schematic diagram of IoT gateway 10 integrated with an engine and an associated or compatible compressor panel.

Figure 10:
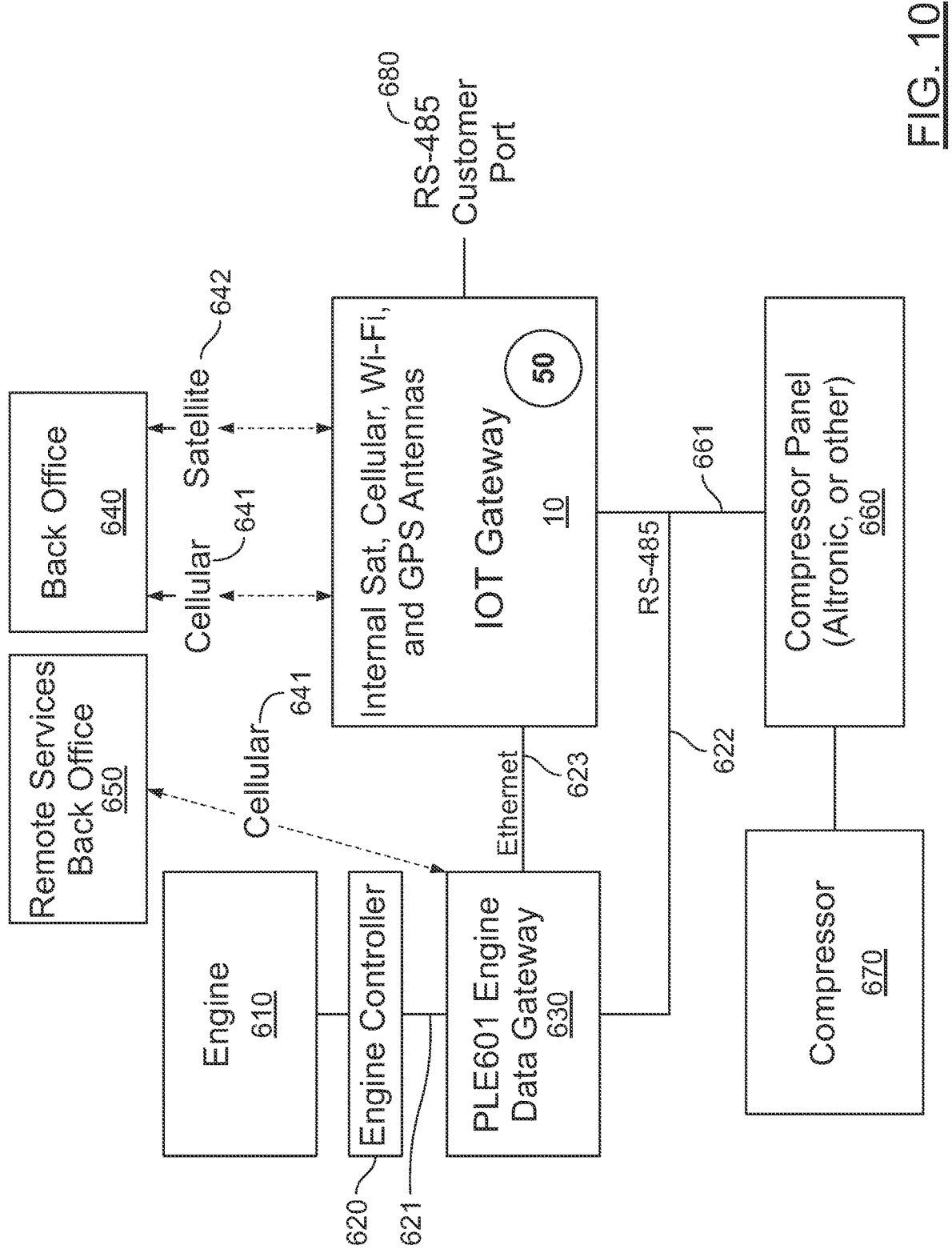

FIG. 10 depicts an example schematic diagram of IoT gateway 10 integrated with an engine and an associated or compatible compressor panel.

DETAILED DESCRIPTION OF THE EMBODIMENTS

The following descriptions relate to presently preferred embodiments and are not to be construed as describing limits to the invention, whereas the broader scope of the invention should instead be considered with reference to the claims, which may be now appended or may later be added or amended in this or related applications. Unless indicated otherwise, it is to be understood that terms used in these descriptions generally have the same meanings as those that would be understood by persons of ordinary skill in the art. It should also be understood that terms used are generally intended to have the ordinary meanings that would be understood within the context of the related art, and they generally should not be restricted to formal or ideal definitions, conceptually encompassing equivalents, unless and only to the extent that a particular context clearly requires otherwise.

For purposes of these descriptions, a few wording simplifications should also be understood as universal, except to the extent otherwise clarified in a particular context either in the specification or in particular claims. The use of the term "or" should be understood as referring to alternatives, although it is generally used to mean "and/or" unless explicitly indicated to refer to alternatives only, or unless the alternatives are inherently mutually exclusive. When referencing values, the term "about" may be used to indicate an approximate value, generally one that could be read as being that value plus or minus half of the value. "A" or "an" and the like may mean one or more, unless clearly indicated otherwise. Such "one or more" meanings are most especially intended when references are made in conjunction with open-ended words such as "having," "comprising" or "including." Likewise, "another" object may mean at least a second object or more.

Figure 1:
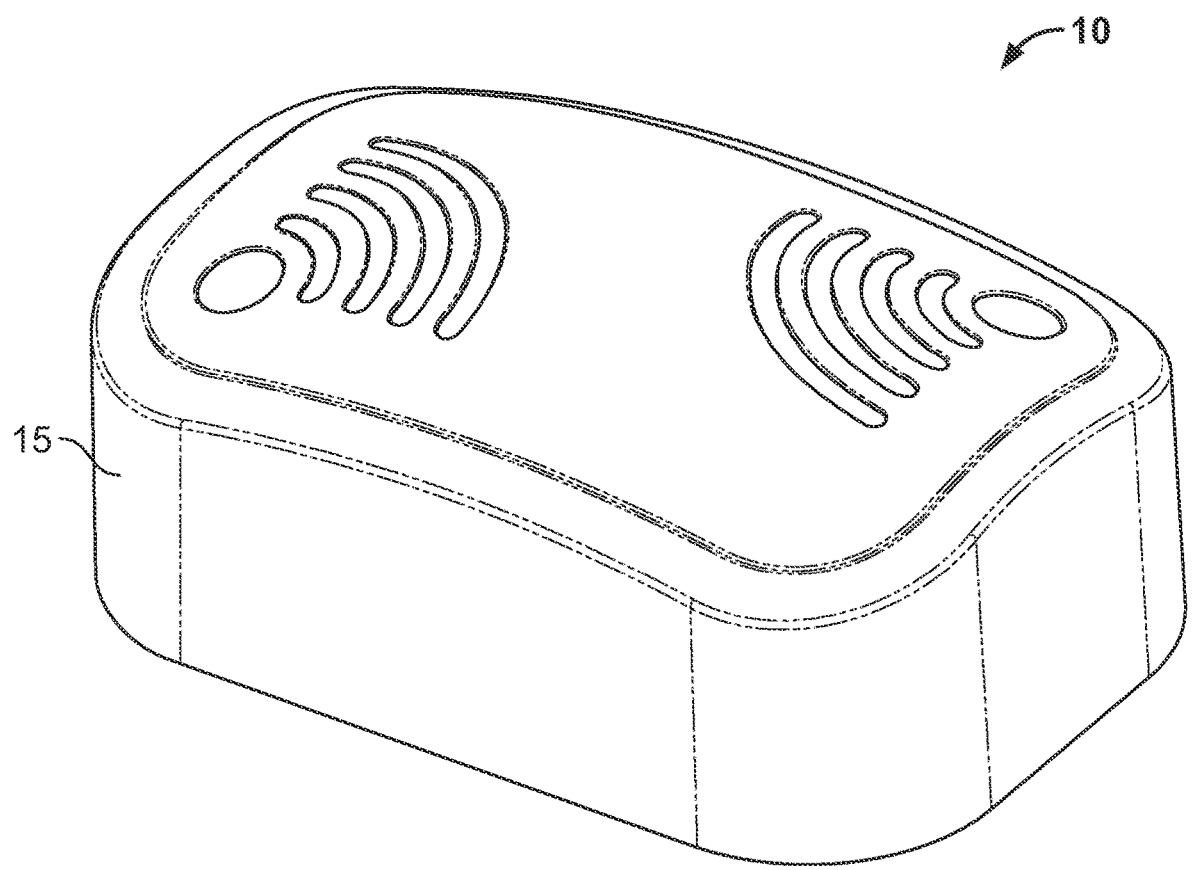
FIG. 1 depicts a perspective view of an example physical embodiment of IoT gateway 10.

Shown in FIG. 1 is a perspective view of an example embodiment of IoT gateway 10. Such an embodiment 10 can comprise a hard cover 15 which protects the electrical and other internal components. Such an embodiment can for example, comprise dimensions such as 8 inches by 5 inches by 2.75 inches. For example, the initial product planned by the Applicant is currently selected to be 8.10 inches long, 5.14 inches wide, and 2.76 inches deep. Of course, other sizes are possible depending on aspects of applications, manufacturing costs, implementation constraints, and/or other requirements, factors, or opportunities.

IoT gateway 10 can be configured to be fully sealed and weather resistant. Alternatively, IoT gateway 10 which is particularly advantageous when IoT gateway 10 can be configured to be partially sealed as a stand-alone device, but fully sealed and weather resistant when operatively mounted, for example installed on top of an exposed panel enclosure (often a preferred mounting location). In another implementation, IoT gateway 10 can be configured to be fully sealed when mounted on a weather resistant pole for improving communication signal strength. Further as to resistance to environmental conditions, IoT gateway 10 can be configured to operate over a wide range of temperature conditions and extremes, for example operating over a temperature range between −40 and +85 degrees Celsius.

Embodiments of IoT gateway 10 have several features including high performance operation (with latency and interrupt response time sufficient to handle firmware requirements).

IoT gateway 10 can be arranged to comprise sufficient non-volatile storage for data logging, software updates, and other purposes. (For example, a practical product can be configured to provide at least four gigabytes (GB) of non-volatile storage).

IoT gateway 10 can be arranged to comprise sufficient quantity of volatile random-access memory (RAM). (For example, a practical product can be configured to provide at least having 1 GB RAM), IoT gateway 10 can be configured to meet various regulatory compliance certifications including but not limited to CSA Class 1 Division 2 (B,C,D) (North America)—T4, UCSA, and UL. Since IoT gateway 10 is preferably located in proximity to natural gas compression equipment, and given that natural gas is inherently volatile, IoT gateway 10 is designed to be explosion proof in order to meet the CSA Class 1 Division 2 standard.

IoT gateway 10 can be configured to internally include and/or interface with at least one temperature sensor 50 (as shown in FIGS. 5-10). IoT gateway 10 can be configured to comprise onboard software that can read, log, and/or interpret temperature readings provided by the temperature sensor(s). If a temperature measurement exceeds thresholds, IoT gateway 10 can be configured to signal an engine and/or compressor controllers to resolve or cope with those conditions. For example, in an overheating situation, an external engine controller can adjust engine and or compressor operation by controlling the cycle of the compressor 170 (shown in FIG. 3) to ensure the temperature measured by one or more temperature sensor(s) and presented to IoT gateway 10 is reduced to indicate that hotspots are eliminated.

The IoT gateway 10 is preferably configured to include one or more internal antennas and/or an external antenna adapter (not shown). Such an external antenna adapter can be used to further enhance the data communication capabilities of internal cellular, satellite, and GPS antennas, or locate the antenna outside an explosive environment area.

Additionally, regarding explosion concerns, IoT gateway 10 can be configured to comprise sealed electrical connectors, preferably using rubber grommets wrapped around the connectors to further enable a seal. Having sealed mechanical and electrical connectors further enables IoT gateway 10 to be spark resistant. Further, IoT gateway 10 can be configured to operate with low voltages and currents so as to limit spark generation should a wire or connector fail. Electrical inductor coils with sufficiently high inductance to generate extremely high voltages if suddenly electrically severed from a fatiguing circuit board can be avoided by appropriate electronic design.

In addition to being configured to be CSA Class 1 Division 2 compliant and shock proof, IoT gateway 10 can further be configured to be IP67 compliant in aspects such as "level 6" dust-proof and "level 7" water-proof (for example, robust to up to one meter immersion) requirements.

Figure 2A:
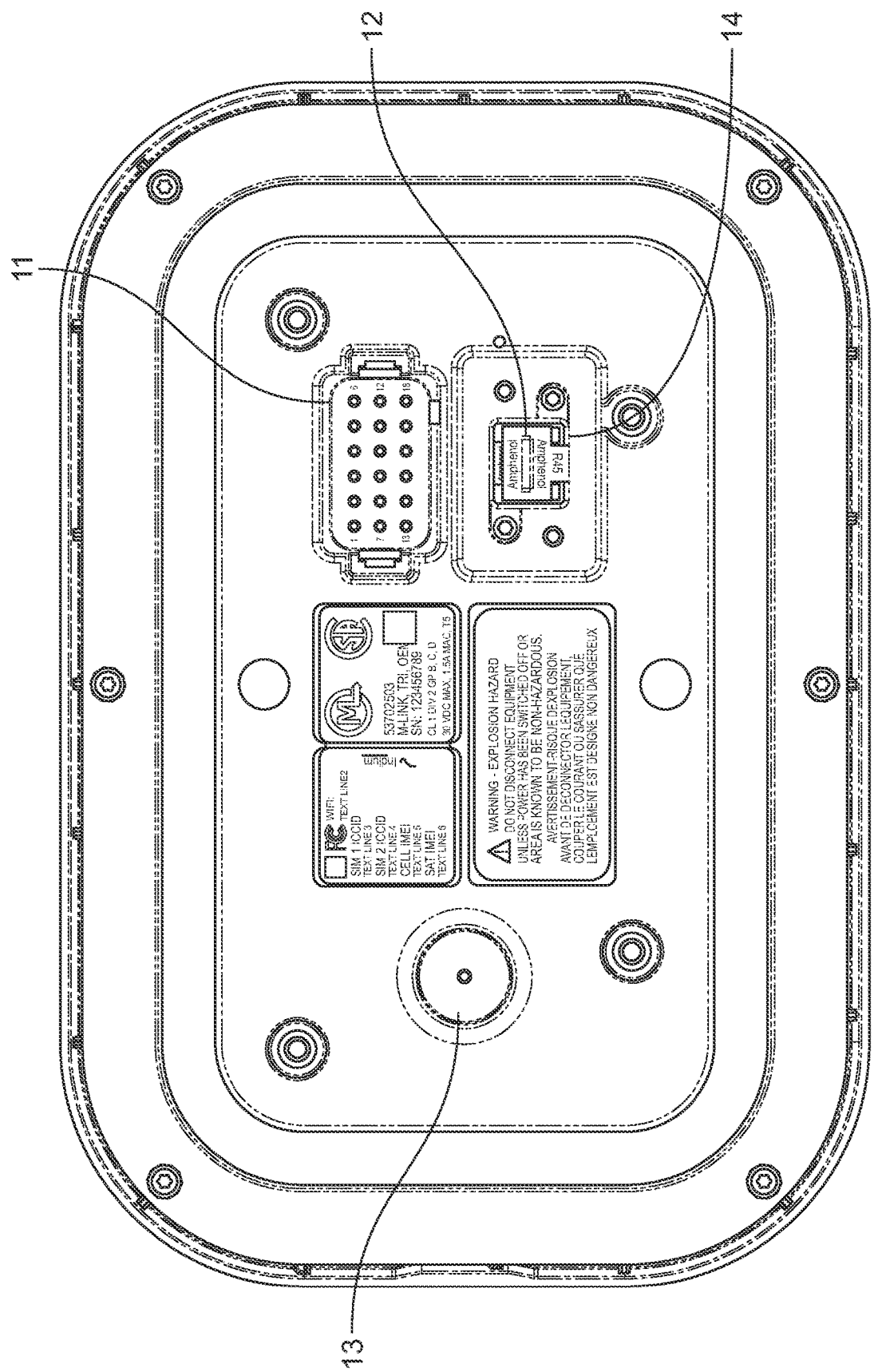
FIG. 2A depicts a bottom plan view of some mechanical features of a physical embodiment of IoT gateway 10 in accordance with FIG. 1.

FIG. 2A depicts a bottom plan view of certain mechanical features of an embodiment of IoT gateway 10. Embodiments of IoT gateway 10 can include various connector sockets, for example one or more instances of 6-pin Deutsch-style connectors, RJ45 Ethernet socket connectors, Molex™ connectors, 0.1"-center ribbon-cable connectors, DB-series and HDB-series connectors, USB connectors, etc. The example embodiment shown in FIG. 2A depicts incorporation of an 18-pin Deutsch style connector 11 (which facilitates connection to a compressor panel and RS-485 connections) and an RJ45 Ethernet socket connector 12 with dust cap 14. Using such connectors, IoT gateway 10 can be arranged to provide wired bus-support communication capabilities (for example RS485, I2C, SPI, Dallas OneWire™, etc.) and wired and/or fiber point-to-point communication capabilities (for example RS 232, RS 422, point-to-point Ethernet™, USB, etc.). IoT gateway 10 can be further be arranged to provide application-level protocols (for example the Modbus serial communications protocol originally published by Modicon, now Schneider Electric, for communicating with programmable logic controllers (PLCs) and other devices, Modbus over Ethernet™ support, etc.). Also shown in FIG. 2A is a vent plug 13, preferably incorporating a temish membrane.

Figure 2B:
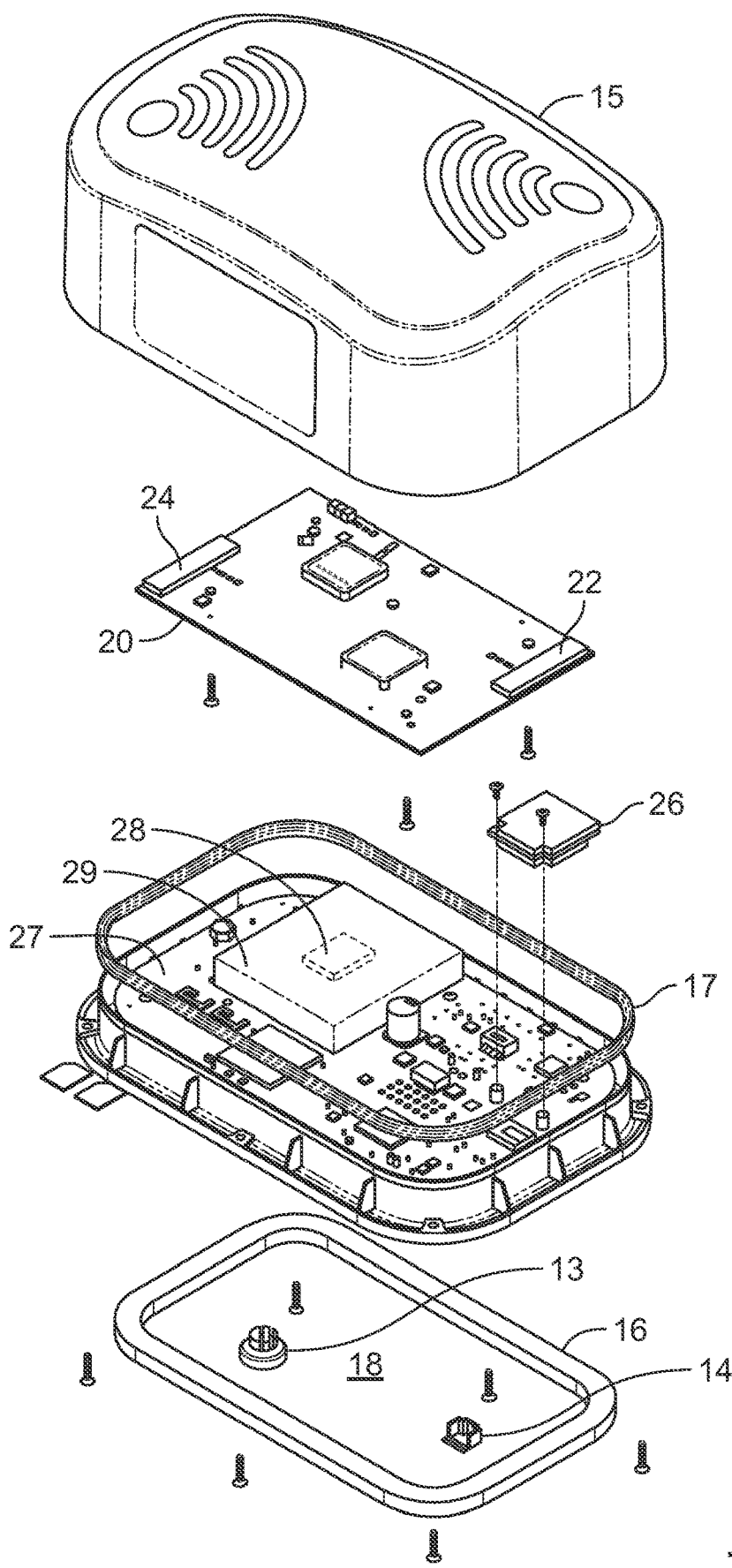
FIG. 2B depicts an exploded view of IoT gateway 10 illustrating a number of internal features.

FIG. 2B shows an exploded view of IoT gateway 10. Hard cover 15 is shown at the top. The first internal component of IoT gateway 10, shown just below hard cover 15, is printed circuit board (PCB) 20. In preferred embodiments, PCB 20 includes a multi-cure conformal coating. Positioned on PCB 20 are two cellular antennas 22, 24 for providing cellular network connections through which IoT gateway 10 communicates with remote devices. IoT gateway 10 further incorporates satellite module 26, providing IoT gateway 10 with satellite communications capabilities.

Because IoT gateway 10 will often be utilized outdoors with exposure to the elements, IoT gateway 10 includes at least two features for preventing intrusion of moisture into the interior portion, thereby preventing damage to the internal components. One of these features is seal 17 positioned at the interface of cover 15 and bottom enclosure 18. As illustrated, the walls of cover 15 enclose the interior components of IoT gateway 10, and the walls of cover 15 further surround the outer edge of bottom enclosure 18 when IoT gateway 10 is completely assembled. Seal 17 serves to prevent the entry of moisture between the walls of cover 15 and bottom enclosure 18. Furthermore, positioned on the bottom of IoT gateway 10 is gasket 16 that helps to prevent entry of moisture through the bottom of IoT gateway 10.

Also shown is a second printed circuit board (PCB) 27, positioned below PCB 20. PCB 27 includes an onboard microprocessor 28. Microprocessor 28 includes and operates to control the primary functions of IoT gateway 10. In part to protect microprocessor 28 and its associated memory chips from electromagnetic interference from the cellular, satellite and other internal antennae within the upper part of the housing, there is an electromagnetic shield 29 covering microprocessor 28 and those chips. More importantly, though, that same shield 29 (or, alternatively, separate but comparable electromagnetic shields) also covers several sources for EM noise that are on the circuit board to do the reverse—i.e., to shield the antennae from noise emitted by those several sources. More particularly, in preferred embodiments, those several sources include an Ethernet module and the main power supply for the IoT gateway circuit board.

Shield 29 is an electrically conductive (preferably metallic) enclosure that encloses a space around microprocessor 28. More particularly, shield 29 covers the top and sides (but not the lower surface, as that is shielded by the ground layers of the circuit board 27) of microprocessor 28 and the other components that are shielded, although one or more of the lateral sides of shield 29 may be perforated or provided with "fencing" to allow ventilation of the space around microprocessor 28 for purposes of heat dissipation. Shield 29 operates to protect microprocessor 28 from electromagnetic emissions from the cellular antennas 22, 24, as well as from satellite module 26 (as well as WiFi and Bluetooth antennas) and, vice versa, to protect the antennas and the like 22, 24, 26 from electromagnetic emissions from certain "noisy" components on the circuit board. Shield 29 is electrically grounded, preferably to one or more of the ground planes on PCB 27.

System Interface and Communications Features

Using a natural gas compression system, for example implemented on a moveable platform (skid), as a representative example of an industrial machinery system, some illustrative example system interface and communications features are described. In a typical form, a natural gas compression system comprises at least one engine, at least one compressor, and at least one additional sensor system.

As a practical example of an arrangement for engine condition monitoring and coordination, IoT gateway 10 can be configured to provide Controller Area Network (CAN) bus implementation and J1939 communication protocol over the resulting CAN bus.

As a practical example of an arrangement for compressor monitoring and coordination, one of any number of compressor panels 160 as shown in FIG. 3 can be connected with IoT gateway 10. A representative example compressor panel is the Centurion Lite™ Murphy Compressor Panel, commercially available from FW Murphy Production Controls.

Turning to FIG. 3, there is shown a schematic diagram that illustrates use of IoT gateway 10 in the context of a skid-mounted monitoring system 100. The skid mounted monitoring system 100 includes a high-speed, skid-mounted, reciprocating natural gas compressor 170 mounted on skid 99 together with associated components. Those associated components are most basically an engine 110 that serves to provide rotary power through a drive shaft 112 as the prime mover for compressor 170, and a control panel 160 which monitors and coordinates operation of compressor 170 and its engine 110, collecting and displaying operating data pertaining to each.

The compressor 170 may be any conventional high-speed reciprocating natural gas compressor, although the illustrated embodiment includes a multi-stage compressor made by Ariel. Although the present invention can be used with compressors having any number of cylinders, the compressor 170 of the illustrated embodiment has six cylinders and corresponding piston throws 171-176. It should be understood that the terms "throw" and "cylinder" are used interchangeably in regards to these descriptions. Connection to cylinders 171 & 172 is made by throw harnesses 186 & 187. Connection to cylinders 173 & 174 is made by throw harnesses 188 & 189. Connection to cylinders 175 & 176 is made by throw harnesses 190 & 191. Frame harness 192 connects compressor monitoring module 181 to frame end devices. Panel harness 161 (or optional C5 specific harness) is used to connect compressor monitoring module 181 to the IoT gateway 10.

FIG. 3 additionally displays other components that are also included on skid 99, such as, a controller 120 for directly controlling engine 110. Also included, is a wired sensor array 180 for collecting operating data from numerous sensors mounted in and on compressor 170 and for communicating that data to the control panel 160 and beyond, plus a number of other modules 199.

Referring again to the general overview as illustrated in FIG. 3, the engine 110 may also be of any suitable make, so long as it is sized and adapted suitably for driving the compressor 170. The engine controller 120 in the preferred embodiment is the typical ECM controller provided by the manufacturer of engine 110 or its supplier for controlling that type of engine 110 in these types of skid-mounted natural gas compression applications. Engine controller 120 is connected to engine 110 in a typical manner by a multi-conductor wire harness 111. For communication with other skid-mounted systems (i.e., other than the various portions of engine 110), controller 120 is connected by another multi-conductor lead 121 to an engine data gateway 130, which is typically provided by the engine's 110 manufacturer. As will be referenced further below, the network manager 130 is connected to interface with control panel 160 and the associated IoT gateway 10. In the illustrated embodiment, that connection to the control panel 160 and IoT gateway 10 is preferably achieved using a Modbus RTU protocol transferred over an RS-485 lead 122.

Control panel 160 is connected to the other skid-mounted systems by means of various wire connections 122, 161, 162, & 163, all of which are multi-conductor cables (and/or harnesses) terminated with multi-pin connectors that mate with opposing connectors on the various skid-mounted subsystems 130, 180, 199, & 10, respectively. Control panel 160 is operatively adapted to display monitored data in an intuitively diagnostic manner through displays 165 & 166 while also wirelessly transmitting such data to remote back office services 150 through a IoT gateway 10. Some embodiments of displays 165 & 166 are touchscreens adapted or programed for display of InView data on screen.

Although not shown in detail in FIG. 3, various pipes, tanks, scrubbers and other associated pieces of equipment and related control modules 199 are also assembled and mounted on skid 99 together with compressor 170 so that it can achieve its principal function of compressing natural gas in a manner suited for storage in a tank and distribution through pipelines, as needed for the particular application.

With the exception of the remote back-office server 150, all components are operatively interconnected and mounted together as an interactive system on skid 99. Such mounting on skid 99 allows the entire assembly to be easily transported to and from the field location wherever it is needed for compressing the natural gas—either at or near the well site or somewhere in the natural gas collection and distribution pipeline network. Although skid 99 is only shown as a rectangular boundary in the drawing of FIG. 3, it should be understood as a conventional compressor skid by those skilled in the art.

Shown in the upper portion of FIG. 3 is a perspective view of IoT gateway 10. IoT gateway 10 has an outer cover 15 that is preferably formed of hard, radio-translucent plastic and serves to protect electrical and other internal components of IoT gateway 10. As viewed from above in illustrated operative orientation, the dimensions of cover 15 are preferably 8.10 inches long, 5.14 inches wide, and 2.76 inches tall (i.e., in the vertical direction), although other sizes are possible depending on particular implementations and requirements. IoT gateway 10 principally serves to wirelessly transmit and receive data from skid 99 to and from back office data services 150 located remotely at another site. This preferably enables real-time or at least daily remote monitoring of compressor operation, so that a remote user can view much the same data as is displayed on control panel 160. Such transmission is achieved in preferred embodiments through cellular or satellite data transmission, preferably using a logic circuit for automatic switching from one type of data transmission to another based on availability, cost, and signal quality, to achieve Internet access.

Through the combination of components operatively linked, the illustrated system therefore includes a network of physical devices capable of communicating and sharing data with each other through various data ports and gateways. Networked in the manner illustrated, control panel 160 aggregates sensor data, translates between sensor protocols, processes that aggregated and translated sensor data and exchanges it through IoT gateway 10 with remote back office servers 150 through the Internet cloud. In addition to the communication of aggregated and translated sensor data, IoT gateway 10 also enables receipt of controller updates as well as remote monitoring and diagnostics for the natural gas compression equipment on skid 99.

When operatively connected, IoT gateway 10 is sealed and is weather resistant, which is particularly advantageous when IoT gateway 10 is installed on top of a panel enclosure, the preferred mounting location within the disclosed system. There is also a weather resistant pole mountable option (not shown) for improving communication signal strength for remote locations. IoT gateway 10 has a preferred operating temperature range between −40 and +85 degrees Celsius. The application subsystem of some embodiments of IoT gateway 10 has several features for improving performance and reliability including: high performance operation (with latency and interrupt response time sufficient to handle firmware requirements), 4 GB or more of non-volatile storage for snapshot event logging, parameter storage, event and diagnostic code storage, and software updates. IoT gateway 10 also further has a large quantity of volatile random-access memory (RAM), at least having 1 GB RAM and preferably more.

Various software features of the compressor monitoring system 100 preferably enable the system to operate more efficiently. For instance, IoT gateway 10 has multiple low-power operating modes. The compressor monitoring system 100 provides internal data logging including logging of a variety of operating parameters, diagnostics, and event snapshots. Additionally, the compressor monitoring system 100 can configure events to trigger data collection and data transmission such as (DTC) and parameter-based logical combinations.

IoT gateway 10 also preferably meets a number of regulatory compliance certifications including, but not limited to, CSA Class 1 Division 2 (B,C,D) (North America)—T4, UCSA, and UL. Since IoT gateway 10 is ideally located in proximity to natural gas compression equipment, and given that natural gas is inherently volatile, IoT gateway 10 is designed to be explosion proof in order to meet the CSA Class 1 Division 2 standard. A temperature sensor 50 (shown in FIGS. 5-10) is located in IoT gateway 10, and the onboard software interprets the temperature reading. If the temperature is too high and exceeds a threshold, IoT gateway 10 will signal the engine and compressor controllers to resolve this. For example, the engine controller can adjust operations by controlling the cycle of the pump to ensure the temperature in IoT gateway 10 is reduced and hotspots are eliminated. Additionally, IoT gateway 10 operates at low voltage and has sealed connectors, preferably using rubber grommets wrapped around the connectors to further enable a seal. Having sealed mechanical and electrical connectors further enables IoT gateway 10 to be spark resistant. In addition to being CSA Class 1 Division 2 compliant and shock proof, IoT gateway 10 is also IP67 compliant. IP67 compliance indicates that IoT gateway 10 is "level 6" dust proof and "level 7" waterproof (up to one meter immersion).

With regard to IoT gateway 10, some embodiments have two 6-pin connectors (not shown) which enable connection to a compressor panel and RS-485 connections. IoT gateway 10 also preferably has an RJ45 Ethernet socket connector (not shown). In some embodiments, instead of two 6-pin connectors, IoT gateway may include one 18-pin Deutsch-style connector (as shown in FIG. 2A). The ports for at least some such connectors are located in one or more recesses in the bottom, downwardly-oriented surface of the housing 15 for IoT gateway 10, with that recess being an upward recess that positions the ports well above the lowermost perimeter of gateway cover 15 to minimize if not eliminate the risk of exposing the connector ports to rain or other liquids.

Preferred embodiments include a IoT gateway 10 with one or more internal antennas in addition to internal shielding to shield its microprocessor from electromagnetic noise from internal antennas. Additionally, an external antenna adapter (not shown) may also be included on the bottom surface of IoT gateway 10 to further enhance the data communication capabilities of the cellular, satellite, and GPS antennas.

The network manager 130 also connects to IoT gateway 10, preferably using an Ethernet cable for engine data transfer. IoT gateway 10 communicates with the remote servers 150 via either cellular or satellite transmission. Preferably, IoT gateway 10 is adapted to communicate through one of at least two cellular connections available for the purpose of redundancy. For instance, one cellular connection can be programmed for data communication through cellular networks of a first cellular carrier ("cellular A") that is controlled by a corresponding carrier (such as Verizon), while a second cellular connection can be programmed for data communication though a second cellular network ("cellular B") that is controlled by a corresponding carrier—typically a different carrier (such as AT&T). If cellular connections fail or are unavailable, IoT gateway 10 will attempt to connect via satellite transmission. In addition, IoT gateway 10 includes logic circuitry with algorithms for determining when to choose one option (cellular A, cellular B, or satellite) based on availability, cost, signal strength, and quality over the other options, and when to switch from one option to another (such as through a process like that illustrated in FIG. 4). It is important to note that having two cellular connections and a satellite connection is unique to the field of natural gas compression control.

Since the network manager 130 communicates with the remote services back office 150 using the same cellular connection as the wireless gateway back office communication, the cellular service provided must support "split tunnel" functionality. The protocol utilized is TCP/IP. The Centurion (or Control panel) Murphy™ Compressor Panel 160 collects data from the compressor 170. IoT gateway 10 connects to the control panel 160 (preferably a Centurion™ Murphy Panel) and gathers compressor 170 data using a CAN (Modbus) connection 161. A separate RS-485 Modbus RTU customer port (not shown) is also preferably included to enable interface with any data management systems that a customer might desire.

Functional Features. The protocols and communication utilized in IoT gateway 10 include TCP/IP, Modbus RTU Master, Modbus RTU Slave, Modbus TCP, SMS messaging, and a Wi-Fi Access Point, as well as any custom protocols that might be requested or desired for particular manufacturer specifications. Security features may include data encryption capability and VPN cellular support. There are also configurable parameters for programming capabilities including: remotely configurable and via local utilities (such as alarm levels, post rates, etc.), remote and local firmware load (device flashing), and Over-the-Air ("OTA") programming of the data logging function.

A number of features and functionalities are incorporated to enable IoT gateway 10 to function within the particular make of engine 110. These features include: configurable Modbus registers for data from the engine controller 120, from the compressor monitoring modules 181, 183, 185, from controllers in control panel 160, and other external devices; 1 Hertz external device data point capture rate; low-power operating mode (Modem Power Control); and internal event snapshot data logging, preferably enabling at least two simultaneous logs.

With respect to communications, a number of features are integrated within the disclosed system, including: Configurable Modbus maps, CAN-based SAE J1939 support, OTA software updates for IoT gateway 10 and EICS equipped engine controllers, OTA configuration updates for IoT gateway 10, an on-board webserver for parameter setting and data viewing, OTA parameter configuration (including Modbus maps), Automatic Communication type switching (Cellular to Satellite being the best path), and Variable Data Post Rates for each data point with Cellular/Satellite selectability (one rate for Cellular and another rate for Satellite).

Hardware Features. There are numerous hardware features for the disclosed system 100. For engine coordination using IoT gateway 10, CAN and J1939 communication is enabled. For compressor coordination, any number of compressor panels may incorporate use of IoT gateway 10. One particular example for control panel 160 is the Centurion® Lite Murphy Compressor Panel which is commercially available from Applicant which has minimum digital inputs including, but not limited to: Emergency stop, Remote Emergency Stop, Lubricator No-flow LB, Lubricator No-flow RB, Engine Oil Level, Compressor Oil Level, Jacket Water Level, Auxiliary Water Level, Fuel Gas Scrubber, $1^{st}$ Stage Scrubber Level, $2^{nd}$ Stage Scrubber Level, $3^{rd}$ Stage Scrubber Level, $4^{th}$ Stage Scrubber Level, Engine Vibration, Compressor Vibration, Cooler Vibration, and at least one spare input for any custom device inputs as may be desired.

There are several hardware features related to modem data communications. For cellular communications, there is selectable support for 4G LTE Verizon, 4G LTE AT&T Networks including KORE, with 3G GSM as a fallback. The satellite communications are conducted through Iridium Communications. There is also a Wi-Fi access point and a GPS for location support.

Wi-Fi and On-Board Webserver. For the onboard webserver (not shown), IoT gateway 10 setup parameters, such as server IP address and port and version information, are available through HTML pages that can be accessed via a built-in Wi-Fi connection. JavaScript Object Notation ("JSON") configuration files are not downloaded using the webserver but instead are done OTA so the server is in sync with IoT gateway 10. The webserver interface eliminates the need for Windows PC-based support software. The Wi-Fi connection is used by local service personnel to view, and in some cases, modify information in the IoT gateway 10.

Remote Engine Support. In addition to control panel access and compressor data exchanges, IoT gateway 10 also enables remote support of engine 100 through engine data gateway 130. While the engine data gateway 130 does not have direct access to the Internet, software is included in the control panel 160 and its IoT gateway 10 to pass a message from the engine manufacturer's remote servers to the engine data gateway 130 indicating that a remote service session is being requested. Once such a request is received, the engine controller 120 and its gateway 130 then initiate a session with the engine manufacturer's remote servers through IoT gateway 10 and, when desired, the engine manufacturer can update or replace the engine controller 120 during such sessions. To facilitate all this, IoT gateway 10 provides an Internet connection to the engine data gateway 130 via an Ethernet port of IoT gateway 10. IoT gateway 10 also passes GPS information to the engine data gateway 130 so engine controller 120 can properly identify itself to the engine manufacturer's server once it makes a connection. The mechanism currently defined for letting IoT gateway 10 know that a remote services session is being requested is for the server to send IoT gateway 10 a Short Message Service ("SMS") message. This is referred to as the SMS "Shoulder Tap" mechanism.

E&D Support. IoT gateway 10 provides event and diagnostic support using codes obtained from different engine controllers. For engines with EIS and ADEM III or newer engine controllers, Event and Diagnostic ("E&D") codes are obtained from the engine data gateway 130. If a Murphy EICS engine controller is used instead, then E&D information is extracted from that.

The E&D mechanism is defined for other hardware devices, and from the server's point of view the data exchange should be the same. In this context, there may be up to seven E&D Units. Only one unit is supported in IoT gateway 10. E&D codes from the EICS should be sent in as close to the same format as those obtained from the engine data gateway 130.

Compressor Panel Power Loss Detection. IoT gateway 10 also has features for compressor panel power loss detection. If compressor panel power is lost but not IoT gateway 10 power, IoT gateway 10 will detect that condition and report it. IoT gateway 10 will stop the scheduled posts except for a once-a-day notice that the condition still exists. When power is restored to the panel, operation will begin as normal. If power is lost to IoT gateway 10, it will shut down until power is restored, after which it will start normal operation.

Remote Access. Preferably, IoT gateway 10 has additional features such as an Ethernet port, Remote Centurion Access, and Remote External Device Access. The Ethernet port serves as a data connection to connect IoT gateway 10 to the rest of compressor monitoring system 100, in part to provide an internet connection for the engine data gateway 130. When not used for remote services, the Ethernet port of IoT gateway 10 can be configured to support Modbus TCP for additional external device support. For Remote Centurion Access, any change that can currently be made to the Centurion compressor panel locally, such as changing set points for kills, can be done remotely, whether that is done manually or automated through a user interface. Program changes to the Centurion compressor panel can be done locally or remotely. For Remote External Device Access, remote devices are accessed through control messages sent by the back office servers 150 to the illustrated system through IoT gateway 10.

There are several hardware features related to modem data communications. For cellular communications, there is selectable support for 4G LTE Verizon, 4G LTE AT&T Networks including KORE, with 3G GSM as a fallback. The satellite communications are preferably conducted through Iridium satellite communications network services, although other satellite service may be substituted if available. There is also a Wi-Fi access point and a GPS module for location support, which includes for location verification to help confirm available wireless network options.

Turning now to FIG. 4, there is shown a flowchart detailing an example of a process for the selection of a wide area wireless communication network through which IoT gateway 10 communicates with remote servers 150 (depicted in FIG. 3). As explained below, there are several criteria upon which IoT gateway 10 determines which wide area communication network to utilize at any particular time—i.e., whether to communicate over one of the available cellular networks, and which one, or whether to communicate over the satellite network. By default, the first factor is cost, such that the cellular network having the lowest cost at the time of the desired communication is initially determined to be the first priority choice by default. Vice versa, because satellite communications are universally more expensive than any cellular options, the satellite communications option is initially determined to be the last priority choice by default. However, for some skids and/or certain types of data transmissions, other factors may be more important than cost. Such other factors can include signal strength and signal quality in certain embodiments, while still other factors may also be considered as would be understood by those of ordinary skill in the art. At any given time, more than one factor may be used in a polynomial algorithm to determine which communication network to employ.

The wide area network determination process of FIG. 4 starts at Step 400, when an operating session of IoT gateway 10 is activated. At Step 410, the main processor 28 of the IoT gateway 10 determines which communication network options are enabled (the "Enabled Network Options") and what is their Order of Priority for use by IoT gateway 10. By "Order of Priority", we mean the order in which the networks should be tried, ordered from 1 to n where "n" is the total number of Enabled Network Options. But, before determining the ultimate Order of Priority, the main processor 28 of IoT gateway 10 first which networks qualify as Enabled Network Options. This "Enabled" determination considers software settings stored in memory as well as whether SIM-comparable data is populated for the corresponding network options. The corresponding software settings are stored in memory registries as either "Enabled" or "Disabled", a setting that can be pre-programmed in memory or adjusted over the air during reconfiguration sessions. By determining whether SIM-comparable data is populated for the corresponding network option, the main processor 28 essentially is detecting, for cellular networks, whether the corresponding cellular network has a SIM card installed. If no SIM-comparable data is populated for the cellular network, then there is no SIM card installed, and the corresponding network is resolved to not be an Enabled Network Option. For a satellite network, there generally is no SIM card, but if the satellite network module is installed, that module contains its own SIM-comparable data, such that a satellite network is always "Enabled" so long as the software settings indicate as much.

As reflected elsewhere in these descriptions, preferred embodiments are routinely provided with three Enabled Network Options—cellular A, cellular B and satellite—such that "n" would be 3. And, by default, the Order of Priority for those three options is as follows: Network(1) as the cellular network for the carrier with the lowest rate for the times and the location of skid 99; Network(2) as the other cellular carrier's network; and Network(3) as the satellite network. Rather than being limited to the preferred embodiments, though, FIG. 4 depicts that aspect as "Network(1), Network(2), . . . Network(n)" in Step 410, recognizing that "n" may be more than three in alternative embodiments. Further, although the default Order of Priority is based on price, the main processor 28 of IoT gateway 10 is also programmed to enable over-the-air reprioritization of the Order of Priority, if desired, such as if certain lower cost network options are suspected of being unreliable when such unreliability is more risky than the risk of paying more.

Hence, as described in the immediately foregoing paragraphs, preferred embodiments determine which communication networks are both (i) installed with SIM cards (or populated with comparable SIM data tables in the case of satellite modules) and (ii) have corresponding software settings that indicate whether the respective network is otherwise enabled for use, all as a background part of Step 410 of the process depicted in FIG. 4. And, then, of those networks that are determined to be Enabled Network Options, Step 410 then determines the corresponding Order of Priority for those Enabled Network Options. As described, that Order of Priority is based on defaults or, if the defaults have been updated, then the latest update for preferred priorities as stored in non-volatile memory. Accordingly, the Order of Priority may effectively be updated by remote back office server 150 or based upon an algorithm depending on lowest cost or other variables at any the skid's location (per GPS module on board) and based on the current time of day.

Irrespective, once the Order of Priority for the Enabled Network Options {Networks(1)-(n)} is determined in Step 410, the process of FIG. 4 proceeds through Steps 420, 430, 440 & 450 (collectively, the "Connection Testing Steps") to test which of the Enabled Network Options can be connected, testing each in the determined Order of Priority until a suitable connection is established over one of those Enabled Network Options. More specifically, Step 420 is illustrated as first setting two counters—"T" for Tries (as in how many tries has the system attempted for all of the Enabled Network Options) and "N" for Network (as in which of the Enabled Network Options is it testing now)—setting both of the counters to initially be equal to one. Then, the rest of the Connection Testing Steps proceed to test each of the Enabled Network Options in the Order of Priority, trying each of them for a preset number of tries ("$T_{MAX}$", as referenced in Step 440). So, starting with the first network in the Order of Priority (i.e., "Network$_{(1)}$"), the main processor of IoT gateway 10 attempts to connect with each network at Step 430, then attempts each of the others in the Order of Priority and does that whole process for $T_{MAX}$ number of tries without interruption.

However, if a viable connection with a network has still not been successful after $T_{MAX}$ tries, Step 430 then causes the main microprocessor to suspend further testing for a Pre-Set Duration ("$t_1$"). Only as examples, $t_1$ might be pre-set as low as one minute or as high as 24 hours, depending on preference. Or, the pre-set $t_1$ might be variable based on other factors such that $t_1$ is determined by an algorithm. Whatever the pre-set time is, the effect is that, after the main microprocessor 28 has tried all Enabled Network Options $T_{MAX}$ times (which is also a pre-set duration according to defaults, inputs and/or multiple factors according to an algorithm), it then suspends further tries for a $t_1$ period of time, after which it starts over with its tries, starting again with Network(1) in the Order of Priority.

After selection of a communication network based on the two criteria already mentioned (Order of Priority and, effectively, signal strength), at Step 460, IoT gateway 10 will then use that Network for another Pre-Set Duration of time ($t_2$), which may also be set according to preference. Then during Step 460, if the duration $t_2$ is reached, the main microprocessor 28 then starts the Network Testing Process again to see if it should switch communications to another network. Or, if the session ends (Step 470), which may be in the form of signal failure before reaching the $t_2$ Pre-Set Duration, then the entire process of FIG. 4 begins again with the next session. It should be understood that, although the switching between communication networks performed by IoT gateway 10 is performed according to the described criteria, other criteria may be used as understood by one of ordinary skill in the art.

The Centurion Lite compressor panel provides a number of digital status outputs (for example Ignition Shutdown, Driven Equipment Ready, Fuel Shutdown, Engine Panel Shutdown, Common Shutdown, and Common Alarm). IoT gateway 10 can use these outputs to receive, process, and provide status monitoring information to remote logging, monitoring, analysis, and/or control systems and associated personnel.

The Centurion Lite compressor panel also supports incoming digital input commands (for example Emergency Stop, Remote Emergency Stop, Lubricator No-flow LB, Lubricator No-flow RB, Engine Oil Level, Compressor Oil Level, Jacket Water Level, Auxiliary Water Level, Fuel Gas Scrubber, $1^{st}$ Stage Scrubber Level, $2^{nd}$ Stage Scrubber Level, $3^{rd}$ Stage Scrubber Level, $4^{th}$ Stage Scrubber Level, Engine Vibration, Compressor Vibration, Cooler Vibration, and Spare). The Centurion Lite also has analog inputs for various pressure sensors including: Engine Oil Pressure, Compressor Oil Pressure, Fuel Gas Pressure, Suction Pressure, $1^{st}$ Stage Discharge Pressure, $2^{nd}$ Stage Discharge Pressure, $3^{rd}$ Stage Discharge Pressure, 4th Stage Discharge Pressure, Spare, and Spare TC using a puck. Still further, Centurion Lite has analog electrical temperature sensor (thermocouple) inputs including: Suction Temperature, $1^{st}$ Stage Discharge Temperature, $2^{nd}$ Stage Discharge Temperature, $3^{rd}$ Stage Discharge Temperature, $4^{th}$ Stage Discharge Temperature, Compressor Oil Temperature, Engine Oil Temperature, and Engine Manifold Temperature. Additionally, the Centurion Lite has a Frequency Magnetic Pick-Up (MPU) electrical input. In some implementations, such input signals would not be presented to IoT gateway 10. In other implementations, such input signals would be presented to IoT gateway 10 to receive, process, and provide status monitoring information to remote logging, monitoring, analysis, and/or control systems and associated personnel.

As an example of a representative additional sensor system, PXT-K Series Pressure Transmitters ("PXT-K") are pressure monitoring devices that can be used in applications for monitoring the conditions and operations of elements such as compressors, engines, process control, liquid level, and pumps in the disclosed system. Each piezoresistive pressure transmitter contains a transducer comprised of a piezoresistive silicon chip mounted on a glass-metal feed-through header welded into a stainless steel housing and filled with silicone oil. IoT gateway 10 can be configured to comprise signal inputs for one or more pressure monitoring devices such as PXT-K. Examples of pressure monitoring quantities can include: Engine Oil Pressure, Compressor Oil Pressure, Suction Pressure $1^{st}$ Stage Discharge Pressure, $2^{nd}$ Stage Discharge Pressure, $3^{rd}$ Stage Discharge Pressure, and $4^{th}$ Stage Discharge Pressure.

Communications Features

IoT gateway 10 can be configured to comprise a number of hardware features related to modem data communications. For cellular communications, there is selectable support for 4G LTE Verizon, 4G LTE AT&T Networks including KORE, with 3G GSM as a fallback. The satellite communications are conducted through Iridium Communications. IoT gateway 10 can be configured to comprise a Wi-Fi access point and/or a GPS capability for location support.

IoT gateway 10 can be configured to implement and support communication protocols such as TCP/IP, Modbus RTU Master, Modbus RTU Slave, Modbus TCP, SMS messaging, and Wi-Fi Access Point protocol, among others.

Further, IoT gateway 10 can be configured to implement and support security features that can include data encryption capability and VPN cellular support. IoT gateway 10 can be configured to implement configurable parameters relating to programming capabilities such as remotely configurable and local utilities (such as alarm levels, post rates, etc.), remote and local firmware load (for example, device flashing), and Over-the-Air ("OTA") programming of the data logging function.

With respect to applications-level and operational communications, a number of features can be integrated into IoT gateway 10. These can include, for example

- Configurable Modbus maps;
- CAN-based Society of Automotive Engineers (SAE) J1939protocol standards ;
- "Over-The-Air" (OTA) software updates for IoT gateway 10;
- OTA software updates for EICS equipped engine controllers;
- OTA configuration updates for IoT gateway 10;
- on-board webserver providing web pages that can be used for parameter setting and data viewing;
- OTA parameter configuration (including Modbus maps) ;
- Dual cellular protocols (such as LTE and 4G through different carrier networks; and
- Satellite communications (for example Iridium Low Earth Orbit) protocols.

Additional communications features can include:
- Best-path automatic communication type switching (Cellular 1, Cellular 2 . . . Cellular N, Satellite); and
- Variable data post rates for each data transmission via Cellular/Satellite selectability (one rate for Cellular link and another rate for Satellite link).

Other Features

A number of features and functionalities are incorporated to enable IoT gateway 10 to function within an engine system. These features include:
- 100 configurable Modbus registers for data from the Product Link™ Elite ("PLE"), compressor panels,
- Engine control systems (for example, the FW Murphy Engine Integrated Control System or EICS®),
- Other external devices (expandable to 400 registers in future generations);
- 1 Hertz external device data point capture rate;
- Low-power operating mode (Modem Power Control); and
- Internal event snapshot data logging (for example, enabling recording of multiple simultaneous logs).

With respect to monitoring an example natural gas compression system, IoT gateway 10 can be configured to provide a number of relevant features, such as:
- a Robust Alarm (RBE) mechanism (to be described) including:
  - dead-bands, de-bounce, and formula-based suppression, on-board alarm dead-bands, de-bounce, and shutdown suppression;
  - Implied Decimal support for post data;
  - Four level (for example High-high, high, low, and low-low) alarm settings on each reading;
  - Greater Than or Equal and Less Than or Equal alarm settings on each reading;
  - De-bounce (delay) and hysteresis on all alarm levels;
  - Individual alarm enable/disable that allows alarms to be turned on and off without affecting the alarm level settings;
  - Change of state alarms functionality;
- Slope and offset adjustments on all readings that allow conversions of raw readings to engineering units,
- Programmable host server IP address and port (for data posting connections),
- Ability to mark individual data point samples as invalid;
- Ability to read and write to registers in compression controllers (compressor panels) and engine controllers;
- Allow 0 posting rate groups (RBE only);
- Programmable serial port parameters (Baud Rate, # Data Bits, Parity, # Stop Bits);
- Event and Diagnostic Code Support via the PLE601 and the EICS;
- Public and proprietary J1939 support;
- GPS information transferrable to Network Manager;
- PLE Ethernet Pass-Through for Remote Services;
- Ethernet Modbus TCP support when not used for remote services;
- SMS "Shoulder Tap" mechanism;
- Flexible Demand Polling on an individual or grouped data point basis, alarm trigger operations for local control applications (in Murphy Panel);
- Message buffer (for example, with a capacity of up to 500 messages) that prevents data loss due to communications interruptions (after communications interruptions data transmitted in the order of their occurrence);
- Remote retrieval of data logs (configurable to limit file size, data cost and transfer time);
- Event and diagnostic code support for CDL;
- Event and diagnostic code support for J1939 (via the PLE601 Network Manager);
- Ability to pack multiple digital values in a single data point;
- Compressor panel power loss detection;
- Password protected local access; and
- Remote compressor panel (for example Centurion Lite) access.

Wi-Fi and On-Board Webserver

IoT gateway 10 can be configured to include an onboard webserver (not shown). Such a webserver can be used to provide a user interface that can eliminate the need for Windows PC-based support software, and the webserver can accordingly be used as an access server. In some implementations, the webserver is used only as an access server. In an example implementation, a Wi-Fi connection is used by local service personnel to view, and in some cases, modify information comprised by IoT gateway 10.

The IoT gateway 10 can be configured so that setup parameters, such as server IP address and port and version information, are available through HTML pages that can be accessed via a built-in Wi-Fi connection.

In an example implementation, JavaScript Object Notation ("JSON") configuration files are not downloaded using the webserver but instead are done via OTA so the server is in sync with records and operation comprised by IoT gateway 10. IoT gateway 10 can be configured so that a current data snapshot is available in the webserver.

Event and Diagnostic Support

IoT gateway 10 can be configured to provide event and diagnostic support using codes obtained from different engine controllers. As an example for engines:
- For engines with EIS and ADEM III or newer engine controllers, Event and Diagnostic ("E&D") codes can be obtained from the PLE601 gateway.

For engines interfaced with a Murphy EICS® engine controller, then E&D codes can be obtained from the EICS® engine controller.

IoT gateway 10 can be configured so E&D mechanisms or capabilities are defined for other hardware devices, so that from the server's point of view the data exchange should be the same. In this context, there can be up to seven E&D Units. Only one unit is supported in IoT gateway 10. E&D codes from the EICS should be sent in as close to the same format as those obtained from the PLE.

IoT gateway 10 can be configured so an E&D code log file can be kept on board and made accessible by the onboard webserver and to the remote server using appropriate protocols. IoT gateway 10 can be configured so that E&D data points are specified. For example, IoT gateway 10 can be configured so that Event Group (MID) is set to 90, the Diagnostic Group is set to 91, the J1039 (Engine Code) Group is set to 92, and the Meta Data Group is set to 93. The meta data comprised by the Meta Data Group can, for example, comprise one or more of scheduled post data points, data points that are not routinely posted, and potentially other information. IoT gateway 10 can be also configured so that data points that do not match a defined Scheduled Data point are specified like any other data point.

Remote Services Support

For Remote Services Support, IoT gateway 10 can be configured so that remote service sessions can be initiated by the Product Link™ Elite ("PLE"). It is noted that the PLE601 Network Manager product is designed to support a service allowing remote access to an ADEM III or newer engine controller. If the server does not have direct access to the PLE, IoT gateway 10 can be configured so that a mechanism can pass a message to the PLE indicating that a remote service session is being requested. To facilitate this, IoT gateway 10 can provide an internet connection to the PLE via a communication port (for example the Ethernet port 12 shown in FIG. 2A).

IoT gateway 10 can also be configured to pass GPS information to the PLE so it can properly identify itself to the server once it makes a connection. For example, IoT gateway 10 can be notified that a remote services session is being requested by the server sending a Short Message Service ("SMS") message (referred to as a SMS "Shoulder Tap").

Compressor Panel Power Loss Detection

IoT gateway 10 can be configured to provide features for compressor panel power loss detection. For example, should compressor panel power be lost while IoT gateway 10 is still powered, the IoT gateway 10 can be configured to detect that condition and report it to entities via one of its wide area communications links. IoT gateway 10 can be configured to cease scheduled posts other than a less-frequent notice (for example, once a day) that the compressor panel power loss condition still exists. IoT gateway 10 can be configured so that when power is restored to the compressor panel, usual operation will start and continue as normal.

Should power to IoT gateway 10 fail, IoT gateway 10 can be configured to shut down until power is restored, after which it will attempt to start normal operation. In an implementation, IoT gateway 10 can be provided with backup powering provisions including batteries, solar power battery rechanging, etc.

Example Use of Ethernet Port for Remote Controller and Remote External Device Access IoT gateway 10 can be configured to include features such as Ethernet port 12, remote controller panel access (for example, Centurion Lite), and remote external device access. For example, the Ethernet port 12 can be used to provide an internet connection for an PLE601 gateway to support the remote services that the system provides. When not used for remote services, the Ethernet port 12 can be configured to support Modbus TCP for additional external device support. For remote controller panel access (for example, Centurion Lite), IoT gateway 10 can be configured so that some, many, or all changes made to the compressor panel locally (for example changing set points for kills), can be done remotely either automated or manually through a user interface. IoT gateway 10 can also be configured so that Program changes to a remote device, for example a compressor panel, can be also be done locally or remotely. For remote external device access, IoT gateway 10 can also be configured so that remote devices are accessed through ME3 Control Messages sent by the server.

FIG. 5 depicts an example schematic diagram integrated IoT gateway 10 into a system including an engine 110. For FIGS. 5-10 IoT gateway 10 is represented by the planned Murphy "M-Link RTU" product and the terms are used in the specification interchangeably.

As previously described, a temperature sensor 50 can be located in IoT gateway 10 and IoT gateway software can be configured to interpret the temperature measurement provided by the sensor. Should the temperature become high enough to exceed a threshold, IoT gateway 10 can be configured to communicate appropriate signals to the engine 120 and compressor controllers 160.

As an example, the engine 110 comprises an engine controller 120 provided with an ADEM III or newer Engine Control Module (ECM). In this example, a PLE601 Engine Data Gateway 130 acts as a Cat® Network Manager and connects to the engine controller 120 using, for example a Cat® Data Link 121 or use of the J1939 protocol. The Network Manager 130 can be additionally interfaced to IoT gateway 10 using for example the Modbus RTU protocol transferred over RS-485 122. The Network Manager 130 also can be connected to IoT gateway 10 using an Ethernet cable 123 for engine data transfer.

IoT gateway 10 communicates with the Back Office 140 via either cellular 141 or satellite transmission 142. As described earlier, IoT gateway 10 can be configured to provide at least two cellular connections 141 for redundancy. Should both cellular connections fail, IoT gateway 10 can be configured to then attempt to connect via satellite transmission 142. It is important to note that having two cellular connections 141 and a satellite connection 142 is unique to the field of natural gas compression control.

The data protocol implemented for communication can be the ME3 proprietary protocol transferred over TCP/IP.

Since in this example the Network Manager 130 necessarily communicates with the Back Office 150 using the same cellular connection 141 as IoT gateway 10 uses for Back Office communication, the cellular service provided must support "split tunnel" functionality, for example utilizing TCP/IP. In this example, the compressor panel (for example, Centurion Lite) 160 collects data from the compressor 170, and IoT gateway 10 connects to the compressor panel 160 so as to gather compressor 170 data over a CAN (Modbus) connection 161. A separate RS-485 Modbus RTU customer port 190 can be included to interface with third party data systems, such as for the benefits of customers or service providers needing local access to the IoT gateway 10.

Turning to FIG. 6, there is shown a schematic diagram of another example where IoT gateway 10 is integrated with an engine 210 and a Murphy EICS controller 220. It is understood, however, that other types of subsystems can be used for the example. In this example arrangement, the Centurion Murphy Panel 260 collects data from both the Murphy EICS 220 and the compressor 270, and IoT gateway 10 gathers this engine and compressor data from the Centurion Murphy Compressor Panel 260 over a CAN (Modbus) connection 261. IoT gateway 10 communicates with the Back Office 240 via either cellular 241 or satellite transmission 242. The data protocol implemented for communication can be the ME3 proprietary protocol over TCP/IP. A separate RS-485 Modbus RTU customer port 280 can be included to interface with the customer SCADA system described above Turning to FIG. 7, there is shown a schematic diagram of another example wherein IoT gateway 10 is integrated with an engine 310. For simplicity, the engine 310 and the engine controller 320 are shown in the same box of the schematic diagram. Here, a Waukesha® ESM 1 or 2 engine controller is used for units that support either Modbus or CAN interface. The compressor panel 360 (such as the Murphy Centurion Lite) collects data from both the engine controller 320 and the compressor 370. IoT gateway 10 gathers this engine and compressor data from the Centurion Murphy Compressor Panel 360 over a CAN (Modbus) connection 361. IoT gateway 10 communicates with the Back Office 340 via either cellular 341 or satellite transmission 342. The data protocol implemented for communication can be the ME3 proprietary protocol over TCP/IP. A separate RS-485 Modbus RTU customer port 380 can be included to interface with the customer SCADA system.

Turning to FIG. 8, there is shown a schematic diagram of IoT gateway 10 integrated with an all mechanical engine 410. The Centurion Lite Murphy Compressor Panel 460 collects data from both the engine 410 and the compressor 470. IoT gateway 10 gathers this engine 410 and compressor 470 data from the Centurion Lite Murphy Compressor Panel 460 over a CAN (Modbus) connection 461. IoT gateway 10 communicates with the Back Office 440 via either cellular 441 or satellite transmission 442. The data protocol implemented for communication is the ME3 proprietary protocol over TCP/IP. A separate RS-485 Modbus RTU customer port 480 is included to interface with the customer SCADA system.

Turning to FIG. 9, there is shown a schematic diagram of another example wherein IoT gateway 10 integrated with an arbitrary engine 510 and an arbitrary compressor panel 560. The compressor panel 560 can be an Altronic or another functionally suitable product or system. The compressor panel 560 collects data from the compressor 570 and in some instances collects data from the engine controller 520. IoT gateway 10 gathers this compressor 570 data from the compressor panel 560 using a Modbus RTU 561 via a RS-485 serial port. IoT gateway 10 can gather engine 510 data from the compressor panel 560 (via RS-485 561) or directly from the engine controller 520 via a RS-485 Modbus RTU 521 or a J1939 522. IoT gateway 10 communicates with the Back Office 540 via either cellular 541 or satellite transmission 542. The data protocol implemented for communication can be the ME3 proprietary protocol over TCP/IP. A separate RS-485 Modbus RTU customer port 580 can be included to interface with the customer SCADA system.

Turning to FIG. 10, there is shown a schematic diagram of an example wherein IoT gateway 10 is integrated with an engine 610 and an arbitrary compressor panel 660. The engine 610 has an engine controller 620 with an ADEM III or newer Engine Control Module (ECM). The Network Manager (PLE601 Engine Data Gateway) 630 connects to the engine controller 620 using a Cat® Data Link (or J1939) 621. The Network Manager 630 is interfaced with IoT gateway 10 using Modbus RTU protocol transferred over RS-485 622. The non-Murphy compressor panel 660 can be an Altronic or another suitable panel. The compressor panel 660 collects data from the compressor 670 and in some instances collects data from the Network Manager 630. In this example IoT gateway 10 gathers this compressor 670 data from the compressor panel 660 using a Modbus RTU 661 via a RS-485 serial port. IoT gateway 10 can gather engine 610 data from the compressor panel 660 (via RS-485 661) or directly from the Network Manager 630 via a RS-485 using Modbus RTU serial protocol 622 or an Ethernet cable 623.

As shown in FIG. 10, IoT gateway 10 communicates with the Back Office 640 via either cellular 641 or satellite transmission 642. The data protocol implemented for communication can be the ME3 proprietary protocol over TCP/IP. Since the Cat® Network Manager 630 communicates with the Remote Services Back Office 650 using the same cellular connection as IoT gateway 10 Back Office 640 communication, the cellular service provided must support "split tunnel" functionality, for example using TCP/IP. A separate RS-485 Modbus RTU customer port 680 can be included to interface with the customer SCADA system.

While IoT gateway 10 been disclosed according to preferred and alternate embodiments, those of ordinary skill in the art will understand that still other embodiments have been enabled according to the foregoing disclosure. Such other embodiments shall fall within the scope and meaning of the appended claims. Hence the drawings and detailed descriptions herein should be considered illustrative, not exhaustive. They do not limit the invention to the particular forms and examples disclosed. To the contrary, the invention includes many further modifications, changes, rearrangements, substitutions, alternatives, design choices, and embodiments apparent to those of ordinary skill in the art, without departing from the spirit and scope of this invention. In any case, all substantially equivalent systems, articles, and methods should be considered within the scope of the invention and, absent express indication otherwise, all structural or functional equivalents are anticipated to remain within the spirit and scope of the presently disclosed systems and methods.

We claim:

1. An Internet of Things (IoT) gateway configured to provide communication protocols and to enable remote monitoring of a natural gas compression system for event and diagnostic support, the natural gas compression system including a natural gas compressor and a natural gas compressor panel, the IoT gateway comprising:
   a) a cover and a bottom enclosure, the cover including walls that interface with the bottom enclosure;
   b) a first printed circuit board (PCB) positioned inside the cover, wherein the first PCB includes two cellular antennas, each being adapted to provide a cellular communication network connection;
   c) a satellite module adapted to provide connection to a satellite communication network;
   d) a second PCB having a microprocessor mounted thereon;
   e) a seal positioned at the interface between the cover walls and the bottom enclosure, the seal being configured to prevent intrusion of moisture into an interior of the IoT gateway;
   f) a gasket positioned on the bottom enclosure, the gasket being configured to prevent intrusion of moisture into the interior of the IoT gateway;

g) a shield covering the top and sides of the microprocessor, the shield being arranged and configured to protect the microprocessor from electromagnetic interference;

h) one or more connection sockets positioned on an exterior portion of the cover, wherein at least one of the one or more connection sockets enables a wired connection to the natural gas compression panel, the wired connection being adapted and configured to enable communication of data between the IoT gateway and the natural gas compression panel;

i) wherein the microprocessor is adapted and configured to:
1) determine which communication networks are enabled;
2) determine an order of priority of the communication networks based on pre-set criteria;
3) test each communication network in accordance with the determined order of priority of the communication networks, wherein each communication network is tested a maximum number of times; and
4) select a communication network and use the selected communication network for a pre-set duration of time.

2. The IoT gateway as defined in claim 1, wherein the microprocessor is further adapted and configured to detect whether Subscriber Identification Module (SIM) data is populated for each communication network such that when SIM data is detected for a communication network, that communication network is determined to be enabled.

3. The IoT gateway as defined in claim 1, wherein criteria for determining the order of priority of the communication networks includes cost, signal strength, and signal quality.

4. The IoT gateway as defined in claim 3, wherein the communication network having a lowest cost is a first choice by default under the pre-set criteria for the order of priority.

5. The IoT gateway as defined in claim 1, wherein the microprocessor is further adapted and configured to enable over-the-air reconfiguration of the order of priority criteria.

6. The IoT gateway as defined in claim 5, wherein the microprocessor is further adapted and configured to determine whether the communication network having the lowest cost is unreliable such that a communication network having a higher cost is selected based in part on reliability of the signal strength and/or signal quality.

7. The IoT gateway as defined in claim 1, wherein the IoT gateway is configured to be explosion proof and meet regulatory compliance certifications, including Canadian Standards Association (CSA) Class 1, Division 2.

8. The IoT gateway as defined in claim 1, wherein:
a) the IoT gateway is adapted and configured to provide wired communication via an integrated ethernet port;
b) the IoT gateway is further adapted and configured to provide wireless communication via Wi-Fi and/or Bluetooth.

9. The IoT gateway as defined in claim 1, wherein the cover comprises a radio-translucent plastic.

10. An Internet of Things (IoT) gateway configured to provide communication protocols and to enable remote monitoring of a natural gas compression system for event and diagnostic support, the natural gas compression system including a natural gas compressor and a natural gas compressor panel, the IoT gateway comprising:
a) a cover and a bottom enclosure, the cover including walls that interface with the bottom enclosure;
b) a first printed circuit board (PCB) surface positioned inside the cover;
c) a first cellular antenna and a second cellular antenna, each of the first and second antennas being mounted to the first PCB surface, the first cellular antenna being adapted to provide a communication network connection to a first cellular communication network, and the second cellular antenna being adapted to provide a communication network connection to a second cellular communication network;
d) a satellite module adapted to provide connection to a satellite communication network;
e) a second PCB surface having a microprocessor mounted thereon;
f) a seal positioned at the interface between the cover walls and the bottom enclosure, the seal being configured to prevent intrusion of moisture into an interior of the IoT gateway;
g) a gasket positioned on the bottom enclosure, the gasket being configured to prevent intrusion of moisture into the interior of the IoT gateway;
h) a shield positioned between the first PCB surface and the microprocessor, the shield being arranged and configured to protect the microprocessor from electromagnetic interference;
i) one or more connection sockets positioned on an exterior portion of the cover, wherein at least one of the one or more connection sockets enables a wired connection to the natural gas compression panel, the wired connection being adapted and configured to enable communication of data between the IoT gateway and the natural gas compression panel;
j) wherein the microprocessor is adapted and configured to:
1) determine which of the first cellular communication network, the second cellular communication network, and the satellite communication network are enabled;
2) determine an order of priority for the first cellular communication network, the second cellular communication network, and the satellite communication network;
3) test each of the first cellular communication network, the second cellular communication network, and the satellite communication network in accordance with the determined order of priority for each of the communication networks, wherein each communication network is tested a maximum number of times; and
4) select a communication network and use the selected communication network for communication between the IoT gateway and a remote back office server.

11. The IoT gateway as defined in claim 10, wherein the microprocessor, in case of a signal failure of the previously selected communication network, is further adapted and configured to determine which communication networks are enabled, determine the order of priority for the communication networks, test each enabled network, and select a communication network, and use the selected communication network after the signal failure of the previously selected communication network.

12. The IoT gateway as defined in claim 10, wherein criteria for determining the order of priority for the communication networks includes cost, signal strength, and signal quality.

13. The IoT gateway as defined in claim 12, wherein the microprocessor is further adapted and configured to enable over-the-air reprioritization of the order of priority criteria.

14. The IoT gateway as defined in claim 12, wherein the microprocessor is further adapted and configured to determine whether the communication network having the lowest cost has unreliable signal strength and/or signal quality such that a communication network having a higher cost is selected based in part on reliability of the signal strength and/or signal quality.

15. The IoT gateway as defined in claim 10, wherein the IoT gateway is adapted and configured to receive and relay over-the-air updates to one or more components of the natural gas compression system.

16. The IoT gateway as defined in claim 10, wherein the IoT gateway is configured to comply with Canadian Standards Association (CSA) Class 1, Division 2 certification standards.

17. The IoT gateway as defined in claim 10, wherein the IoT gateway is configured to be International Protection (IP) 67 compliant.

18. The IoT gateway as defined in claim 10, wherein the cover comprises a radio-translucent plastic.

19. The IoT gateway as defined in claim 10, wherein the one or more connection sockets includes a Deutsch-style pin connector that enable an operative connection of the IoT gateway to the natural gas compressor panel.

20. A method for facilitating communication between a natural gas compression system and a remote server through use of an Internet of Things (IoT) gateway, wherein the communication is accomplished through cellular and/or satellite communication networks, the method comprising:
   a) providing an IOT gateway, wherein the IOT gateway includes:
      1) a first printed circuit board (PCB) having two cellular antennas configured for providing access to two different cellular communication networks;
      2) a second PCB having a microprocessor mounted thereon; and
      3) a satellite module configured for providing access to a satellite communication network;
   b) determining, by the microprocessor, which of the cellular and satellite communication networks are enabled;
   c) determining, by the microprocessor, an order of priority of the cellular and satellite communication networks;
   d) testing, by the microprocessor, each cellular and satellite communication network connection in accordance with the determined order of priority of the cellular and satellite communication networks, wherein each communication network is tested a maximum number of times;
   e) suspending, for a preset duration, further testing of each cellular and satellite communication network when a connection is not successful after each communication network has been tested for the maximum number of times;
   f) selecting, by the microprocessor, one of the communication networks based on the order of priority and testing of each communication network;
   g) using the selected communication network to send data to and/or receive data from a remote server, wherein the selected communication network is used for a preset duration; and
   h) when the preset duration of use of the selected communication network has elapsed, testing each communication network to determine whether to switch to a communication network other than the selected communication network.

* * * * *